United States Patent
Barry et al.

(10) Patent No.: US 7,554,687 B2
(45) Date of Patent: Jun. 30, 2009

(54) METHODS AND APPARATUS FOR DETERMINING TONER LEVEL IN ELECTRO-PHOTOGRAPHIC PRINT ENGINES

(75) Inventors: Michael W. Barry, Duluth, GA (US); Jack N. Bartholmae, Duluth, GA (US); Francis A. Rowe, Duluth, GA (US); E. Neal Tompkins, Atlanta, GA (US); Peter A. Zuber, Lilburn, GA (US)

(73) Assignee: Electronics For Imaging, Inc., Foster City, CA (US)

( * ) Notice: Subject to any disclaimer, the term of this patent is extended or adjusted under 35 U.S.C. 154(b) by 0 days.

(21) Appl. No.: 11/944,578

(22) Filed: Nov. 23, 2007

(65) Prior Publication Data
US 2008/0068653 A1 Mar. 20, 2008

Related U.S. Application Data

(63) Continuation of application No. 11/120,006, filed on May 2, 2005, now Pat. No. 7,301,665, which is a continuation of application No. 09/848,456, filed on May 3, 2001, now Pat. No. 6,888,644, which is a continuation of application No. 09/044,539, filed on Mar. 19, 1998, now Pat. No. 6,977,752, which is a continuation-in-part of application No. 08/698,999, filed on Aug. 16, 1996, now Pat. No. 5,859,711, which is a continuation-in-part of application No. 08/511,641, filed on Aug. 7, 1995, now Pat. No. 6,657,741.

(51) Int. Cl.
*G06F 15/00* (2006.01)

(52) U.S. Cl. .................. 358/1.15; 358/1.5; 358/1.9; 358/1.18; 347/5; 347/7
(58) Field of Classification Search .................. 358/1.5, 358/1.9, 1.15; 347/5, 7
See application file for complete search history.

(56) References Cited

U.S. PATENT DOCUMENTS 4,277,549 A * 7/1981 Tatsumi et al. ................ 430/30

(Continued)

FOREIGN PATENT DOCUMENTS

EP 0545261 6/1993

(Continued)

OTHER PUBLICATIONS

Wayner, Peter; "Print Pages Faster"; Dec. 1993; Byte Magazine, pp. 115-116 and pp. 119-123.

(Continued)

*Primary Examiner*—David K Moore
*Assistant Examiner*—Mark R Milia
(74) *Attorney, Agent, or Firm*—Michael A. Glenn; Glenn Patent Group

(57) ABSTRACT

The toner in the toner cartridge is determined by taking each of the rasterized images output by the RIP and evaluating the pixel levels over the surface thereof. The average value is determined as a percentage of the maximum toner that can be applied to the page. This is then subtracted from a toner value and a remaining toner level determined. Further, all pages of the rasterized document can be evaluated to predetermine the toner level after printing. If this falls below a predetermined minimum, printing is inhibited for that document.

18 Claims, 25 Drawing Sheets

U.S. PATENT DOCUMENTS

| | | |
|---|---|---|
| 4,373,798 A | 2/1983 | Tsudada et al. |
| 4,459,431 A | 7/1984 | Hiroichi et al. |
| 4,500,919 A | 2/1985 | Schreiber |
| 4,754,428 A | 6/1988 | Schultz et al. |
| 4,791,492 A | 12/1988 | Nagashima et al. |
| 4,809,216 A | 2/1989 | Lai |
| 4,814,791 A | 3/1989 | Ohara et al. |
| 4,959,692 A | 9/1990 | Hayashi et al. |
| 4,999,673 A | 3/1991 | Bares |
| 5,012,285 A | 4/1991 | Oka et al. |
| 5,040,031 A | 8/1991 | Hayashi |
| 5,081,529 A | 1/1992 | Collette |
| 5,105,219 A | 4/1992 | Yoshikado |
| 5,119,473 A | 6/1992 | Ikenoue |
| 5,124,751 A * | 6/1992 | Fukui et al. .................. 399/44 |
| 5,124,809 A | 6/1992 | Koishikawa |
| 5,143,017 A | 9/1992 | Haneda et al. |
| 5,165,074 A | 11/1992 | Melino |
| 5,179,637 A | 1/1993 | Nardozzi |
| 5,195,079 A | 3/1993 | Inoue |
| 5,208,640 A | 5/1993 | Horie et al. |
| 5,220,674 A | 6/1993 | Morgan et al. |
| 5,241,373 A | 8/1993 | Kanamori et al. |
| 5,276,490 A | 1/1994 | Bartholmae et al. |
| 5,287,194 A | 2/1994 | Lobiondo |
| 5,298,107 A | 3/1994 | Scudder et al. |
| 5,303,336 A | 4/1994 | Kageyama et al. |
| 5,315,701 A | 5/1994 | DiNicola et al. |
| 5,319,464 A | 6/1994 | Douglas et al. |
| 5,333,246 A | 7/1994 | Nagasaka |
| 5,339,171 A | 8/1994 | Fujisawa et al. |
| 5,345,315 A | 9/1994 | Shalit |
| 5,347,369 A | 9/1994 | Harrington |
| 5,367,673 A | 11/1994 | Goldsmith et al. |
| 5,392,391 A | 2/1995 | Caulk, Jr. et al. |
| 5,398,107 A | 3/1995 | Bartholmae et al. |
| 5,402,527 A | 3/1995 | Bigby et al. |
| 5,408,590 A | 4/1995 | Dvorzsak |
| 5,412,779 A | 5/1995 | Motoyama |
| 5,428,464 A | 6/1995 | Silverbrook |
| 5,435,544 A | 7/1995 | Mandel |
| 5,442,429 A | 8/1995 | Bartholmae et al. |
| 5,448,655 A | 9/1995 | Yamaguchi |
| 5,450,571 A | 9/1995 | Rosekrans et al. |
| 5,452,403 A | 9/1995 | Miller |
| 5,459,560 A | 10/1995 | Bartholmae et al. |
| 5,467,434 A | 11/1995 | Hower, Jr. et al. |
| 5,469,267 A | 11/1995 | Wang |
| 5,471,563 A | 11/1995 | Dennis et al. |
| 5,528,374 A | 6/1996 | Matias |
| 5,530,527 A | 6/1996 | Fukasawa et al. |
| 5,548,390 A | 8/1996 | Sugisaki et al. |
| 5,550,957 A | 8/1996 | Davidson, Jr. et al. |
| 5,559,933 A | 9/1996 | Boswell |
| 5,563,689 A | 10/1996 | Tompkins et al. |
| 5,563,985 A | 10/1996 | Klassen et al. |
| 5,564,109 A | 10/1996 | Snyder et al. |
| 5,566,003 A | 10/1996 | Hara et al. |
| 5,572,632 A | 11/1996 | Laumeyer et al. |
| 5,580,177 A | 12/1996 | Gase et al. |
| 5,583,623 A | 12/1996 | Bartholmae et al. |
| 5,583,644 A | 12/1996 | Sasanuma et al. |
| 5,590,245 A | 12/1996 | Leamy et al. |
| 5,596,416 A | 1/1997 | Barry et al. |
| 5,630,062 A * | 5/1997 | Okutsu ....................... 718/100 |
| 5,636,032 A * | 6/1997 | Springett ..................... 358/296 |
| 5,649,073 A | 7/1997 | Knox et al. |
| 5,659,407 A | 8/1997 | Andresen et al. |
| 5,663,750 A * | 9/1997 | Sakuma ........................ 347/7 |
| 5,696,595 A | 12/1997 | Yamanishi |
| 5,703,693 A | 12/1997 | Morikawa |
| 5,726,778 A | 3/1998 | Tanio |
| 5,737,665 A | 4/1998 | Sugiyama et al. |
| 5,745,657 A | 4/1998 | Barry et al. |
| 5,760,795 A | 6/1998 | Beck |
| 5,796,930 A | 8/1998 | Gauthier et al. |
| 5,805,314 A | 9/1998 | Abe et al. |
| 5,809,366 A | 9/1998 | Yamakawa et al. |
| 5,833,375 A | 11/1998 | Gauthier et al. |
| 5,845,057 A | 12/1998 | Takeda |
| 5,854,882 A | 12/1998 | Wang |
| 5,859,711 A | 1/1999 | Barry et al. |
| 5,859,933 A | 1/1999 | Sasanuma et al. |
| 5,859,956 A | 1/1999 | Sugiyama et al. |
| 5,860,119 A | 1/1999 | Dockser |
| 5,881,209 A | 3/1999 | Stokes |
| 5,883,724 A | 3/1999 | Yamada |
| 5,915,079 A | 6/1999 | Vondran et al. |
| 5,937,225 A | 8/1999 | Samuels |
| 5,956,044 A | 9/1999 | Giorgianni et al. |
| 5,956,469 A | 9/1999 | Liu et al. |
| 5,960,164 A | 9/1999 | Dorfman et al. |
| 5,995,714 A | 11/1999 | Hadley et al. |
| 6,008,907 A | 12/1999 | Vigneau et al. |
| 6,009,804 A | 1/2000 | Yamada |
| 6,027,200 A | 2/2000 | Takahashi et al. |
| 6,035,103 A | 3/2000 | Zuber |
| 6,047,111 A | 4/2000 | Sugiura et al. |
| 6,075,614 A | 6/2000 | Ohtsuka et al. |
| 6,160,629 A | 12/2000 | Tang et al. |
| 6,168,145 B1 | 1/2001 | Tanaka et al. |
| 6,219,155 B1 | 4/2001 | Zuber |
| 6,243,133 B1 | 6/2001 | Spaulding et al. |
| 6,271,937 B1 | 8/2001 | Zuber |
| 6,275,664 B1 | 8/2001 | Wolf et al. |
| 6,325,368 B1 | 12/2001 | Ikeda et al. |
| 6,327,043 B1 | 12/2001 | Rumph et al. |
| 6,327,050 B1 | 12/2001 | Motamed et al. |
| 6,429,948 B1 | 8/2002 | Rumph et al. |
| 6,452,692 B1 | 9/2002 | Yacoub |
| 6,456,802 B1 | 9/2002 | Phillips |
| 6,476,923 B1 | 11/2002 | Cornell |
| 6,542,702 B2 | 4/2003 | Ahn et al. |
| 6,580,879 B2 | 6/2003 | Coleman et al. |
| 6,584,291 B1 | 6/2003 | Yamamoto |
| 6,606,165 B1 | 8/2003 | Barry et al. |
| 6,636,326 B1 | 10/2003 | Zuber |
| 6,657,741 B1 | 12/2003 | Barry et al. |
| 6,754,455 B2 | 6/2004 | Kawase |
| 6,791,704 B1 | 9/2004 | Moreau et al. |
| 6,853,464 B1 | 2/2005 | Ueda et al. |
| 6,856,430 B1 | 2/2005 | Gase |
| 6,903,837 B1 | 6/2005 | Moreau et al. |
| 6,967,747 B2 | 11/2005 | Housel |
| 7,013,093 B2 | 3/2006 | Nakazato |
| 7,027,187 B1 | 4/2006 | Zuber |
| 7,206,526 B2 | 4/2007 | Kobayashi |
| 2002/0113831 A1 | 8/2002 | Su et al. |
| 2004/0196479 A1 | 10/2004 | Foster et al. |
| 2005/0007621 A1 | 1/2005 | Barry et al. |
| 2006/0245770 A1 | 11/2006 | Choi |

FOREIGN PATENT DOCUMENTS

| | | |
|---|---|---|
| EP | 0550158 | 7/1993 |
| EP | 0556994 | 8/1993 |
| EP | 0601304 | 6/1994 |
| EP | 0603714 | 6/1994 |
| JP | A 54-141645 | 11/1979 |
| JP | A 07-148999 | 6/1995 |

OTHER PUBLICATIONS

The Way Things Work, An Illustrated Encyclopeida of Technology; Copyright 1967; Simon and Schuster NY, USA; pp. 198-199 and pp. 424-425.

IBM Technical Disclosure Bulletin; Sep. 1992; vol. 35, No. 4A.

* cited by examiner

FIG. 1
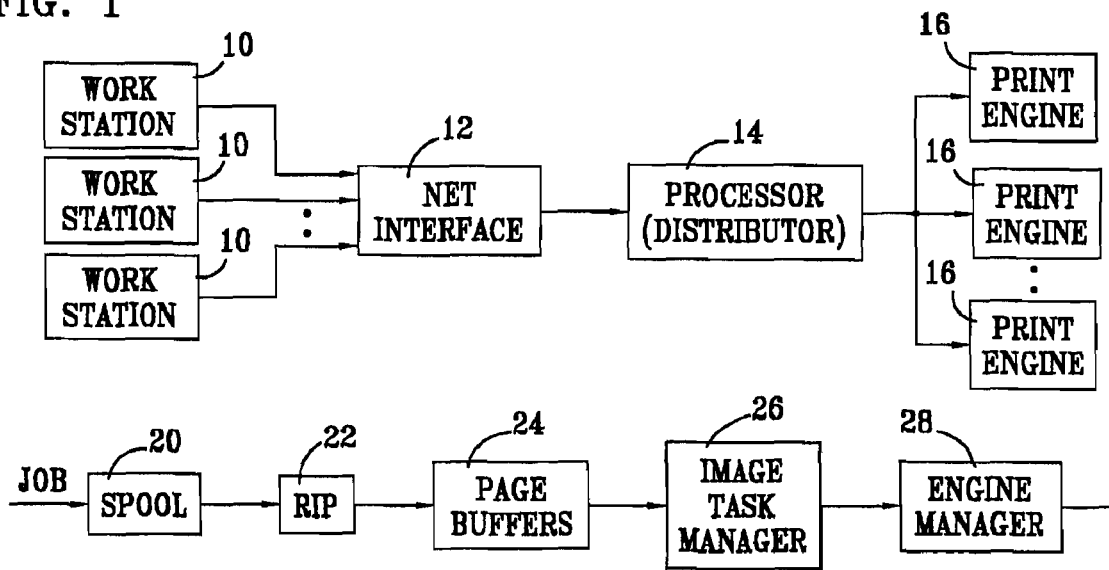
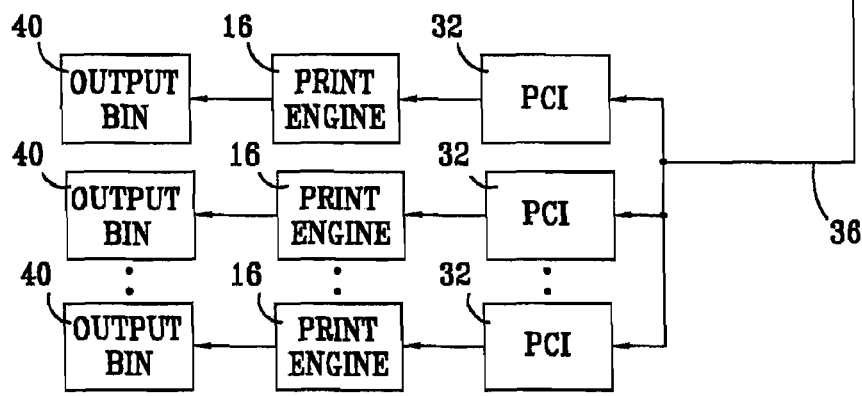
FIG. 3a
FIG. 3b
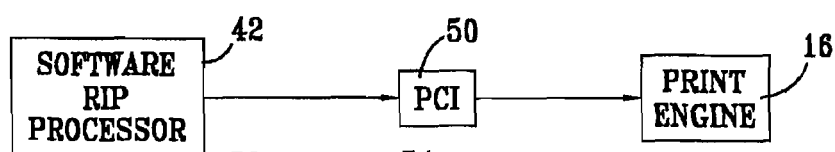
FIG. 3c
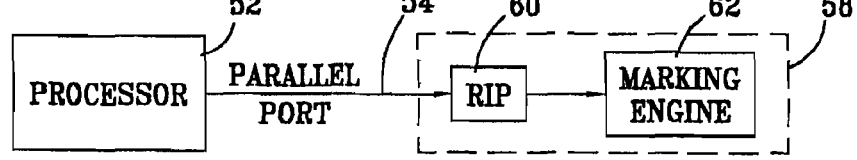

FIG. 8
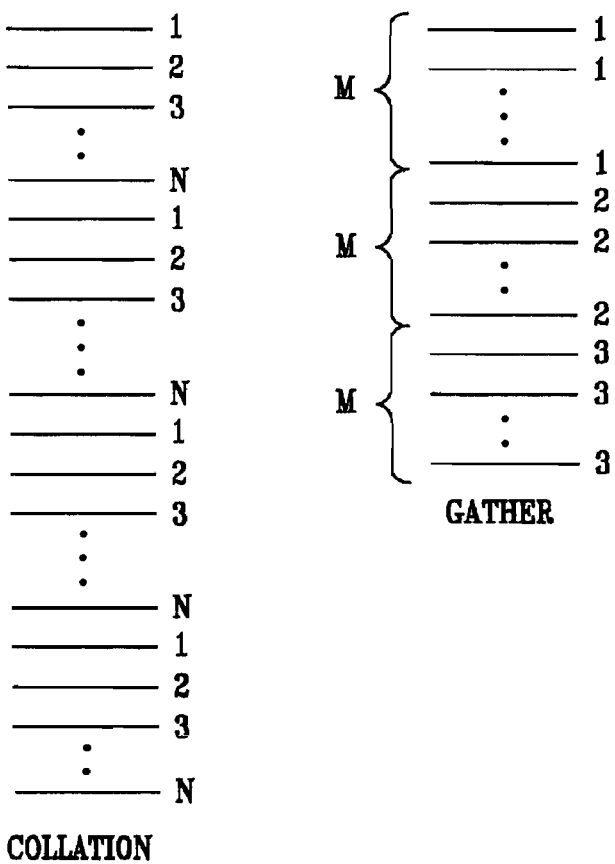
COLLATION
GATHER
FIG. 10
FIG. 11
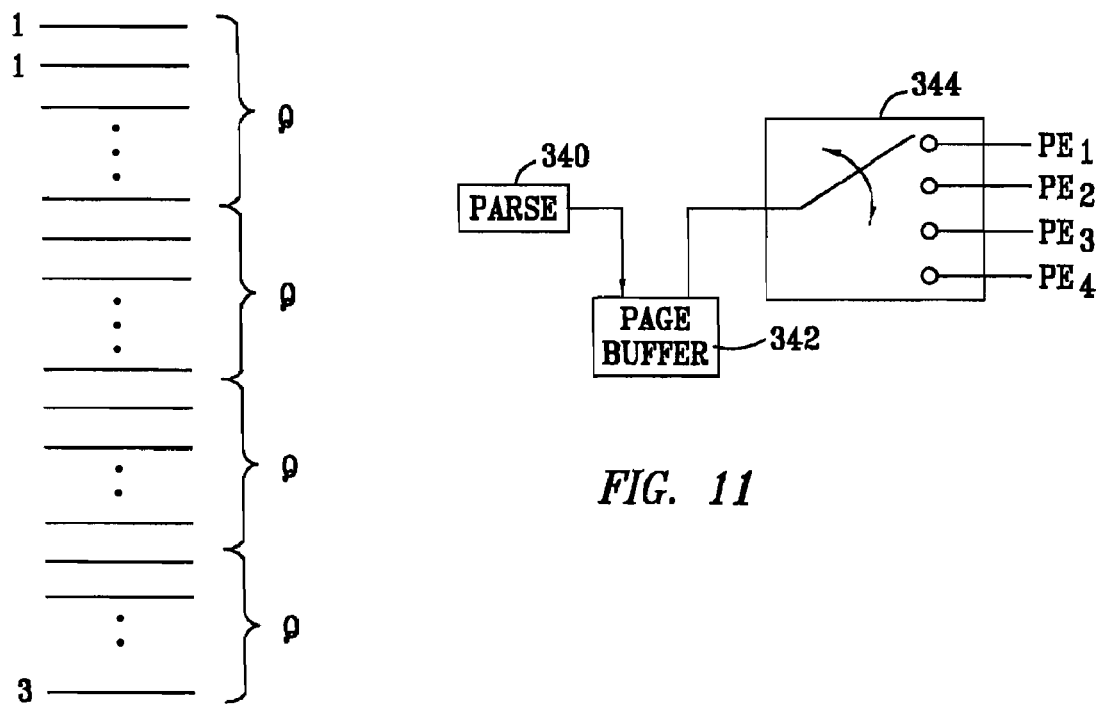

HOST FIFO UNLOAD, PRINTER AF FLAG TOGGLING

METHODS AND APPARATUS FOR DETERMINING TONER LEVEL IN ELECTRO-PHOTOGRAPHIC PRINT ENGINES

REFERENCE TO RELATED APPLICATIONS

This application is a Continuation of U.S. application Ser. No. 11/120,006, filed on May 2, 2005, now U.S. Pat. No. 7,301,665, which is a Continuation of U.S. application Ser. No. 09/848,456, filed on May 3, 2001, now U.S. Pat. No. 6,888,644, which is a Continuation of U.S. application Ser. No. 09/044,539, filed on Mar. 19, 1998, now U.S. Pat. No. 6,977,752, which is a Continuation-in-Part of application Ser. No. 08/698,999, filed Aug. 16, 1996, now U.S. Pat. No. 5,859,711, which is a Continuation-in-Part of application Ser. No. 08/511,641, filed Aug. 7, 1995, now U.S. Pat. No. 6,657,741, the disclosures of each of which are incorporated by reference herein in their entirety.

BACKGROUND

The present invention pertains in general to electrophotographic printers and, more particularly, to a plurality of print engines arranged in parallel to process print jobs in a parallel manner. Electrophotographic print engines have been utilized with both printers and copiers. In a printer, the print engine is typically interfaced with a computer to select and organize fonts or bit map the images. In a copier application, the print engine is interfaced with an input device that scans the image onto the photoconductor drum of the print engine. However, a CCD device could also be utilized in this application in the form of a CCD scanner. In either of the applications, a conventional print engine for a monochrome process would typically feed a single sheet of paper and pass it by the photoconductor drum for an image transfer process and then pass it to a fuser. Thereafter, the completed sheet will be output. Multiple copy print jobs will sequentially feed the paper in a serial manner. The speed of the printer is a function of the speed at which the image can be created, the speed at which the image can be transferred to the paper and the speed of the fuser. As increased output is required, the speed of each of these elements must be increased.

In a monochrome process, only one transfer operation is required. However, in a multipass color process, multiple images must be superimposed on one another on the sheet of paper in a direct transfer system, thus requiring multiple passes of the paper or image carrier through the print engine. In a double transfer system, the image is disposed on an intermediate drum and then the composite image transferred to the paper or image carrier. In a multiple print job on a direct transfer system, this requires each sheet of paper to be printed in a serial manner by passing it through the print engine. For either the monochrome process or the color process, a conventional serial feed print engine has the output thereof defined by the speed of the input device and the speed of the print engine itself.

One technique that has been utilized to increase throughput is a tandem print engine. In a tandem print engine, multiple colors can be disposed on the sheet of paper or the image carrier at different stations that are disposed in serial configuration. In this manner, the speed is the same for one, two, three or four color printing.

When dealing with multiple print engines, there can be a problem that exists with respect to insuring that there is adequate "color balance". In general, all color devices have a native range of colors in which they operate. This is called the color gamut of that device. Any color that falls within this gamut can be reproduced. Any color that falls outside cannot. This gamut is defined by the hardware of the device and its addressability. A monitor uses a phosphorus of some given type and is addressed in 8 bits per channel of RGB. This native gamut or range of colors changes for every different device. If it is desirable to reproduce a color on some devices, two things have to occur. First, those devices would have to be able to make that color, meaning, have that given color inside their gamuts. Second, the color would have to be correctly described, or defined as it moves from one device to another. RGB, CMYK, Lab, LCH, are all methods that devices can utilize to describe colors. They do not always have a direct translation between them, however. A method is needed to correctly translate between these methods. The analogy is as if one person would speak German and another spoke French, wherein an intermediate or interpreter would be required to provide communication.

One method for solving this problem is to use a device independent (or color independent) space. A number of years ago, the CIE created a device independent space (XYZ) that defines color based on the light source they are viewed under, and the color response of the eye. A color independent space is a mathematical way to map device gamuts to see where they intersect. Where they intersect represents the colors they share. It is also the best platform for determining which color to use if gamuts do not intersect. Also, in this master color space, all colors are described or defined using the same terms, independent of any device. In this space, all colors are brought to a common ground. Once a color is defined in XYZ space, it can be sent and accurately reproduced on any device whose gamut in XYZ space includes that color. The reproduction of any color is accomplished by correlating the device native gamut to the color independent space.

During a conventional print operation, toner is used up at a rate that is actually defined by the amount of information that is disposed on the given page multiplied by the number of pages. Typically, systems incorporate some type of page counter that, when it exceeds a predetermined number of pages, indicates that the toner is low. This, of course, is reset when a new toner cartridge is disposed in the printer. However, this toner decision is made strictly based upon the number of pages and not the amount of toner actually depleted from the toner cartridge. This is due to the fact that some pages have a very light toner usage compared to others. For example, an image having a large percentage of black area associated therewith will utilize a large amount of toner, whereas a page having very light gray regions will utilize a small amount of toner. As such, the determination of a low toner level in a cartridge is extremely inaccurate.

SUMMARY

The present invention disclosed and claimed herein comprises a method for determining the actual toner density level in a toner cartridge for a printer. Each page in a multi-page document is rasterized and then the rasterized image evaluated to determine what percentage of the pixels are turned on and to what level they are turned on. An average value is then generated to determine the percent toner relative to a full page that is to be utilized by the printer. When the page is printed, a toner density value register is decremented such that the toner density value will represent the toner that remains in the cartridge.

In another aspect of the present invention, each page of the multi-page document is rasterized and evaluated prior to printing. The toner usage for the entire document is then decremented from the toner density value and this value compared to a minimum value. If it falls below the minimum value, then printing is inhibited.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates an overall block diagram of the virtual printing system;

FIG. 2 illustrates a more detailed block diagram of the virtual printing system;

FIGS. 3a, 3b and 3c illustrate three general processing configurations;

FIG. 8 illustrates a diagrammatic view of the stacking configuration to define a collation and gathering operation;

FIG. 10 illustrates the parsing operation for each printer at given jobs;

FIG. 11 illustrates process flow for the job parsing operation;

DETAILED DESCRIPTION

Figure 4:
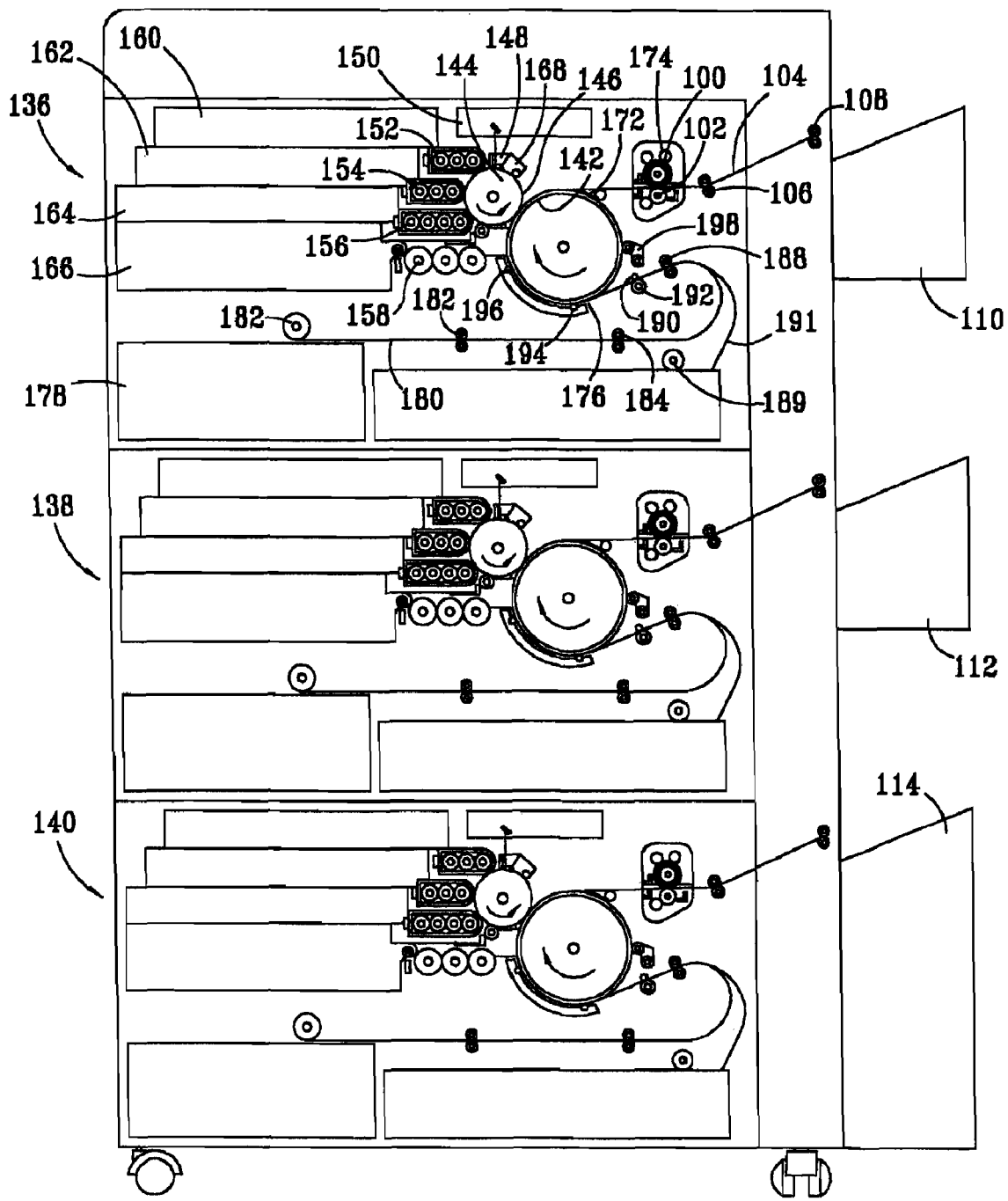
FIG. 4 illustrates a cutaway side view of a three module multiple print engine operated in accordance with the virtual printing system.

Referring now to FIG. 1, there is illustrated a block diagram of the overall operation of the virtual printing system. A plurality of workstations 10 are provided, which workstations 10 comprise general personal computers or other terminals that allow a user to create print jobs. Each of the workstations is networked through a network interface 12, which is a conventional type of general network interface such as an Ethernet® network interface. This allows each workstation 10 to send its print job to a central processor 14, which processor is operable to process the print jobs in accordance with the system of the present invention and distribute these print jobs to multiple print engines 16. As will be described below, the processor 14 is operable to disassemble the print job, parse the print job into different pages and distribute the parsed pages in a predetermined manner in accordance with the present invention.

It should be understood that a print job, although initiated as a series of pages, is sent as a single job to a printer. Typically, printers receive the print job in a conventional manner, which is a string of digits and the printers determine whether the codes are for an end of page command, etc. However, most print operations within a given workstation 10 are designed such that the print job is to be sent to a single printer and, therefore, the codes are all "bundled" in a common string or job. As will be described below, in order for the pages to be parsed, it is important to first determine what the beginning and the end of a print job is, then determine what printer to send that distinct and separate page to, in accordance with the system of the present invention.

Referring now to FIG. 2, there is illustrated a more detailed block diagram of the operation of the processor and the parsing operation for distributing the parsed pages to the various print engines 16. The job is received in a serial manner, and is "spooled" in a print spooler 20. This is then passed to a software RIP engine 22 which is operable to essentially decode the print string that is received from the print spooler 20. This effectively divides each print job into pages. These pages are then stored in page buffers 24. Each page in the page buffer essentially constitutes a single print job, such that any print job received from the workstations 10 will then be parsed into a multiple print job file. For example, if a thirty page document were to be sent, this would be sent as a single print job, which would be encoded as such. The software RIP engine 22 is then operable to divide this into thirty separate print jobs.

Once the pages are stored in the page buffer 24, then the pages are sent to an image task manager 26 to determine how to organize the pages. This operates in conjunction with an engine manager 28 to determine which of the print engines 16 the job is to be passed to. To effectively increase the throughput from the engine manager 28, there are provided interface circuits 32 which are referred to as Peripheral Connect Interface (PCI) adaptors. Each print engine 16 has a PCI 32 associated therewith. Therefore, the engine manager 28 interfaces with the PCIs 32 through a parallel bus 36, such that data can be transferred thereto at a fairly high data rate, which is the bus transfer data rate of the processor 14. The PCIs 32 therefore provide an increased rate of transfer to the print engine 16. The print engines 16 then place their output into a separate output bin 40 for each of the print engines 16.

As will be described below, the image task manager 26 is operable to arrange the copies such that they can be placed in the output bins 40 in a predetermined order. For example, if there were two print engines, each with a 100 sheet paper supply and four print jobs of 50 copies each were to be sent to the printers and the workstation 10, the system of the present invention would parse these print jobs such that the first two print jobs went to the first print engine and the second two print jobs went to the second print engine. If, alternatively, the two print engines with the one hundred sheet paper supplies handled two print jobs, one at a 150 sheets and one at 50 sheets, then the first print engine would receive the first 100 sheets from the first print job, the second print engine would receive the first 50 sheets of the first print job and the second 50 sheets of the second print job. However, they would be sent to the printer in such a manner that when the paper output trays were unloaded and stacked together, the jobs would be arranged in the appropriate manner. Therefore, even though there are multiple printers, to the user they appear as a virtual single printer. All decision making is made in the processor 14.

Referring now to FIGS. 3a-3c, there are illustrated the various configurations illustrating the transfer of data between an input and a print engine. In FIG. 3a, there is illustrated a general diagram of a software RIP processor 42, which is operable to generate the data necessary to transfer to a print engine 46. However, this is effected over a conventional parallel port 48. In this configuration, the software RIP processor 42 is relatively fast, whereas the print engine 46 is relatively slow. Of the time to print, three percent of that time is occupied by the operation of print engine 46, seventy percent is occupied by the software RIP processor 42 and twenty-seven percent is occupied by transferring the data from the processor 42 to the print engine 46. Therefore, the parallel port 48 becomes a key factor in the printing time.

In FIG. 3b, software RIP processor 42 is connected to the print engine 16 via a PCI 50. In this configuration, ninety-five percent of the print time is occupied by the software RIP processor 42, three percent by the print engine 16 and five percent by the PCI 50. Therefore, by reducing the transfer time from the processor 42 to the print engine 16, an increase in speed has been seen. In FIG. 3c, there is illustrated a fairly conventional system wherein a processor 52 is provided, which can be a conventional PC for assembling the print job in a conventional manner and transferring it via a parallel port 54 to an engine 58, which is a conventional print engine having an internal RIP 60 associated with a marking engine 62. The processor 52 is relatively fast, and it occupies virtually no time. Seventeen percent of the print time is taken passing the data to the RIP 60 through the parallel port 54, whereas eighty percent of the print time is occupied with the RIP 60 and only three percent by the marking engine 62.

Referring now to FIG. 4, there is illustrated a cutaway side view of a three print engine module parallel printer which includes three print engines 136, 138 and 40, all stacked one on top of the other. Each of the engines 136-140 is a multi-pass engine and includes a transfer drum 142 and a photoconductor drum 144. The photoconductor drum 144 rotates in a counterclockwise direction and is pressed against the transfer drum 142 to form a nip 146 therebetween. The photoconductor drum 144 is operable to have the surface thereof charged with a corona 148 and then an imaging device 150 is provided for generating a latent image on the charged surface of the photoconductor drum 144. The undeveloped latent image is then passed by four developing stations, three color developing stations, 152, 154 and 156 for the colors yellow, magenta and cyan, and a black and white developing station 158. The color developing stations 152, 154 and 156 each have a respective toner cartridge 160, 162 and 164 associated therewith. The black and white developing station 158 has a black and white toner cartridge 166 associated therewith. Although not described below, each of the developing stations 152-168 and toner cartridges 160-166 can be removed as individual modules for maintenance thereof.

During the print operation, the photoconductor drum 144 is rotated and the surface thereof charged by the corona 148. An undeveloped latent image is then formed on the surface of the photoconductor drum 144 and then passed under the developing stations 150-158. In a multi-pass operation, the latent image is generated and only one color at a time utilized in the developing process for the latent image. This latent image is then passed through the nip 146 and transferred to an image carrier, such as paper, which is disposed on the surface of the transfer drum 142. Thereafter, the surface of the drum 144 is passed under a cleaning station 168, which is operable to remove any excess toner particles which were not passed over to the transfer drum 142 during the transfer operation and also discharges the surface of the drum 144. The system then begins generation of another latent image, either for a different color on the same sheet of paper or the first color on a different sheet of paper.

In the color operation, multiple passes must be made such that the image carrier, i.e., paper, remains on the surface of the transfer drum 142 for the multiple passes. In the first pass, the first latent image is transferred to the surface of the transfer image carrier and then the image carrier maintained on the transfer drum 142. The next latent image of the next color is superimposed on the first latent image, it being noted that the registration is important. This registration is provided by the mechanical alignment of the various drums, drive mechanisms, etc. Thereafter, the third color latent image is disposed on the image carrier followed by the fourth color latent image. After the last color latent image is disposed on the image carrier in the color process, a picker mechanism 172 comes down on the surface of the transfer drum 142 to lift up the edge of the image carrier or paper. This is then fed to a fuser mechanism 174.

The image carrier is typically comprised of a predetermined weight paper. The transfer drum 142 utilizes electrostatic gripping for the purpose of adhering the paper to the surface of the transfer drum 142 for multiple passes. This therefore utilizes some type of charging mechanism for charging the surface of the drum 142 at an attachment point 176 where the paper is fed onto the surface of the transfer drum 142. The transfer drum 142 is, in the preferred embodiment, manufactured from a controlled resistivity type material that is disposed over an aluminum support layer which is a hollow cylindrical member.

A voltage supply is provided that provides a uniform application of voltage from the voltage supply to the underside of the resilient layer that is disposed over the surface of the aluminum support member. This resilient layer is fabricated from a carbon filled elastomer or material such as butadaiene acrylonitorile, which has a thickness of approximately 3 mm. Overlying this resilient layer is a controlled resistivity layer which is composed of a thin dielectric layer of material at a thickness of between 50 and 100 microns. This controlled resistivity layer has a non-linear relationship between the discharge (or relaxation) point tying and the applied voltage such that, as the voltage increases, the discharge time changes as a function thereof. The paper is then disposed over the surface of the drum. The construction of this drum is described in U.S. Pat. No. 5,459,560, which is a continuation-in-part of U.S. Pat. No. 5,276,490, which U.S. patents are incorporated herein by reference.

The paper is retrieved from one of two paper supply bins 178 or 180. The paper supply bin 178 contains one type of paper, typically 8½"×11" paper, and the paper bin 180 contains another type of paper, typically 8½"×14" paper. The paper bin 178 has the paper stored therein selected by a first gripping roller 182, which is then fed along a paper path 180 into a nip 182 between two rollers and then to a nip 184 between two rollers. This is then fed to a paper path 186 to feed into a nip 188 between two rollers. The paper in the nip 188 is then fed into a nip formed between two precurl rollers 190 and 192, which have different durometers to cause the paper to have a curl bias applied thereto in the direction of the curvature of rotation of the transfer drum 142. The operation of the pre-curl rollers is described in detail in U.S. Pat. No. 5,398,107. The paper from the bin 180 is extracted by a gripping roller 189 and pushed along a paper path 191 to the nip 188 and therefrom to the pre-curl rollers 190 and 192.

The paper is fed from the nip between the two pre-curl rollers 190 and 192 at the attachment point 176. At the attachment point 176, an attachment electrode roller 194 is provided which is operable to operate on a cam mechanism (not shown) to urge the roller 194 against the surface of the drum 142 to form the attachment nip 176. This is done during the initial attachment of the paper to the drum 142. Typically, this attachment electrode roller 194 is connected to ground. The surface of the drum 142 is charged to a positive voltage of between 800-1,000 volts. The voltage is disposed on the surface of the drum 142 by a positive electrode roller 196 that contacts the surface of the drum 142 at a point proximate to the photoconductor drum 144. Since the electrode 194 is grounded, the voltage will decrease along the surface thereof until a lower voltage is present at the attachment point 176. When the paper reaches the transfer nip 146, the portion of the surface of the photoconductor drum 144 in the nip 146 has a potential thereof reduced to ground such that the charged particles will be attracted from the surface of the photoconductor drum 144 to the surface of the paper on the drum 142.

For a multiple pass operation, the attachment electrode 176 will be pulled outward from the drum and the paper allowed to remain on the drum and go through the transfer nip 146 for another pass. When the final pass has been achieved at the transfer nip 146, the picker 172 is swung down onto the surface of the drum 142 to direct the paper on the surface of the drum 142 to the fuser 174. A discharge electrode 198 is then swung down into contact with the drum 142 to provide a discharge operation before the surface of the drum enters the nip 176 for the next paper attachment process.

When the paper is fed into the fuser 174, it is passed into a nip between two rollers 200 and 202, both of which have different durometers. Typically, there is one roller that is formed from a metallic material and one roller that is formed of a soft material. The rollers are oriented with the roller 200 having the smaller durometer, such that a reverse bias curl will be applied to the paper that is the opposite direction of the curvature of the drum 142. This will remove the curvature added to the paper. One of the rollers 200 is heated such that the transferred image is "fused". The paper is then fed into a paper path 204 by a pair of rollers 106. The paper path 204 is fed to a set of output rollers 108, which feed bins 110, 112 and 114 for each of the printers 136, 138 and 140. Again, these are conventional print engines, although the speeds of the print engines may be different.

Figure 5:
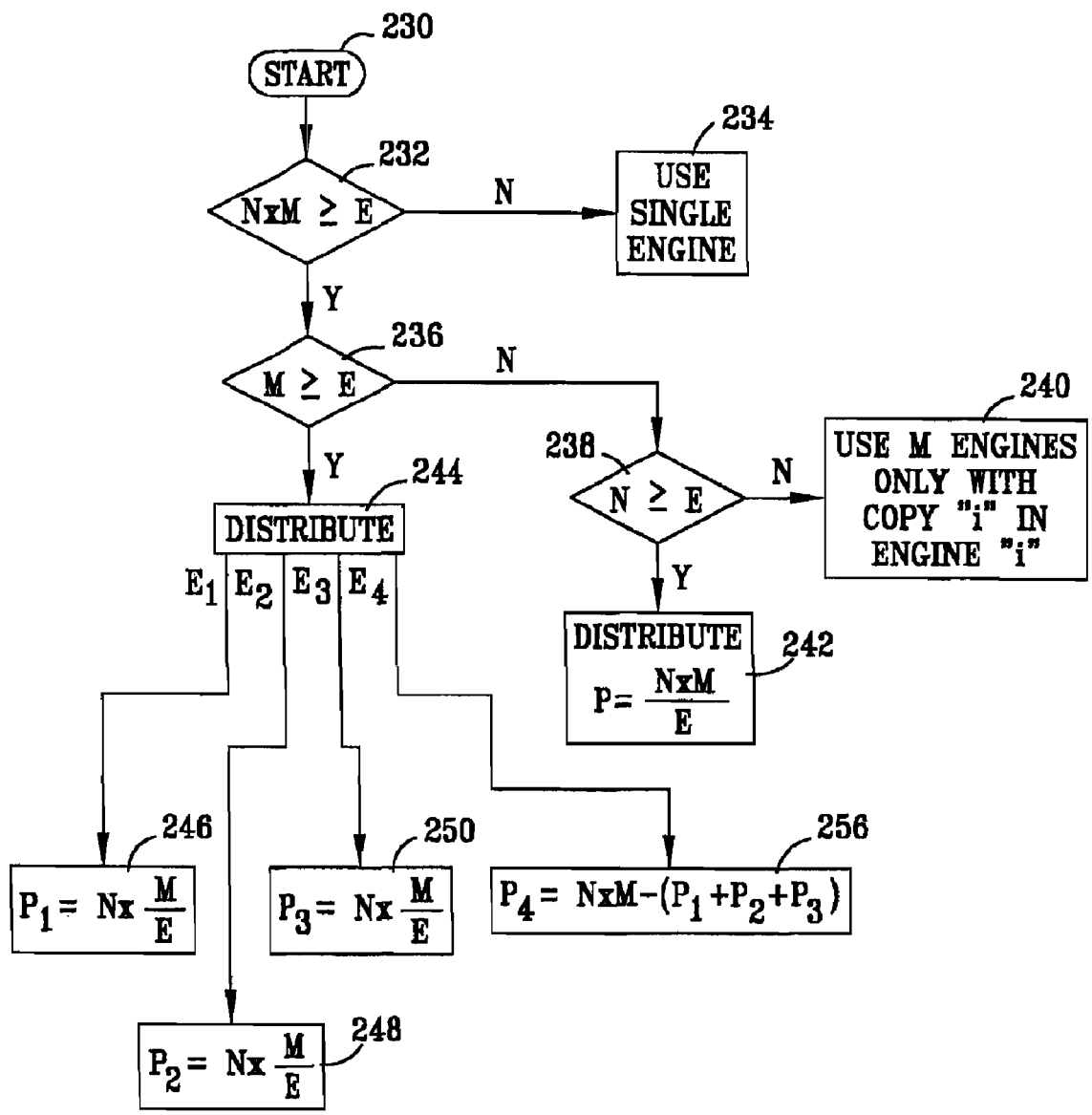
FIG. 5 illustrates a flowchart illustrating the parsing operation.

Referring now to FIG. 5, there is illustrated a flowchart depicting the operation of the virtual printing system. For this description, the following terms are defined:

N=number of pages in a single document
M=copies
E=number of engines
P=number of pages
i=the engine number.

The flowchart is initiated at a start block 230 and then proceeds to a decision block 232. A decision block 232 multiples the number of pages N by the number of copies M and determines whether this number if greater than or equal to the number of engines. If not, then the program flows along a "N" path to a function block 234 to utilize only a single engine for the print job. However, if the number is greater than the number of engines, then the program proceeds along the "Y" path to a decision block 236 to determine the number of copies M is greater than the number of engines E. If not, the program flows along a path "N" to a decision block 238 to determine if the number of pages in a single document "N" is greater than or equal to the number of engines. If not, the program will flow along a "N" path to a function block 240 to utilize the only M engines with the ith copy in the ith engine. Therefore, if there are ten engines and only five copies, then the fifth copy of a job will be in this ith engine. If, however, the number of copies in a single document is greater than the number of engines, then the program will flow along a "Y" path to a function block 242 wherein the copies will be distributed in accordance with the equation:

$$P = \frac{N \times M}{E} \quad (1)$$

If it was determined in the decision block 236 that the number of copies M was greater than the number of engines with the number of copies times the number of pages in a single document also being greater than the number of engines, then the program flows along the "Y" path from decision block 236 to a decision block 244 to distribute copies. These are distributed in accordance with the algorithms illustrated in FIG. 5 with respect to four of the engines E1, E2, E3 and E4. E1, E2 and E3 are also associated with function blocks 246, 248 and 250, each operating in accordance with the above equation, one associated with function block 242. However, E4 will flow to a function block 256 wherein the distribution will be as follows:

$$P_4 = N \times M - (P_1 + P_2 + P_3) \quad (2)$$

Figure 6:
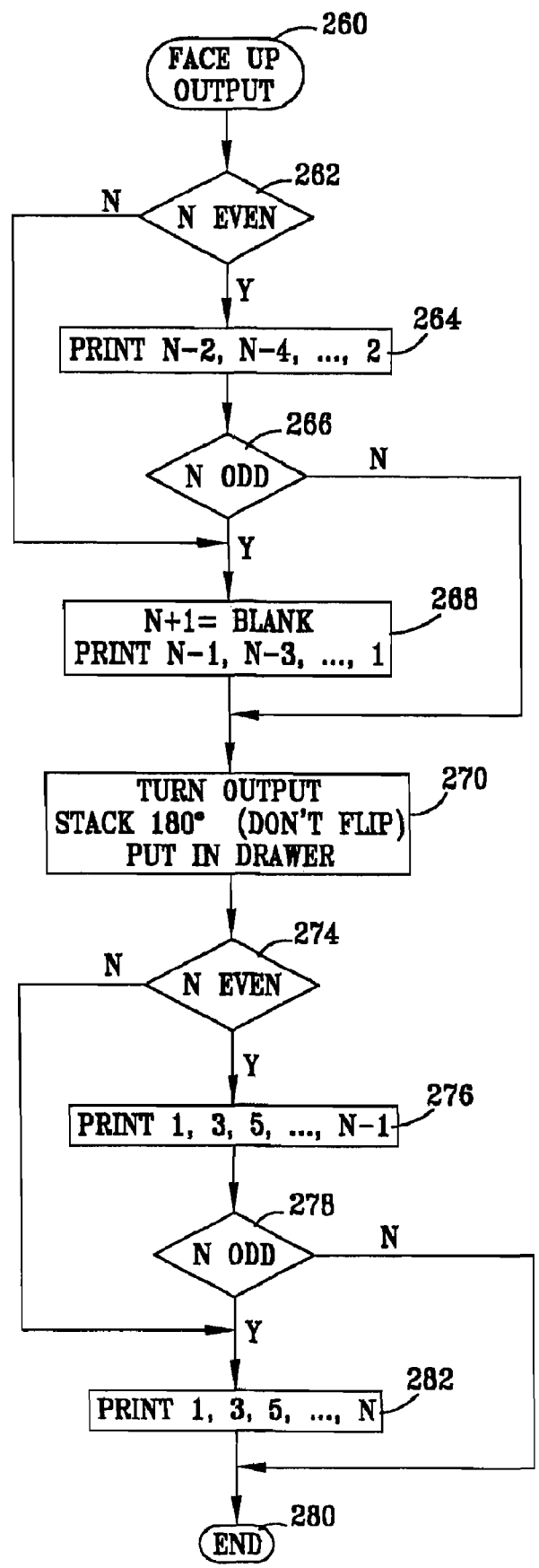
FIG. 6 illustrates a flowchart for the duplex operation for a face up output.

Referring now to FIG. 6, there is illustrated a flowchart depicting the operation for a duplex print job. In the flowchart of FIG. 6, a face up output is considered which is initiated at a block 260. The function block then flows to a decision block 262 to determine if the value of N is even. If so, the program flows to a function block 264 to print the jobs N−2, N−4, ..., 2. The program then flows to a decision block 266, which determines whether the value of N is odd.

However, if N was odd at decision block 266, the program would flow along the "N" path to the output of the decision block 266 and then to a function block 268 to print the N+1 copies and blank copies and then print the N−1, N−3, ..., 1 pages. The flowchart would then flow to a function block 270.

It is noted that if N is even at decision block 266, the program would flow to the function block 270. Function block 270 is a function block wherein a user annually turns the output stack 180° without flipping the stack and then puts it back in the drawer of the printer from which it came.

The program then flows to a decision block 74 to determine if the value of N is even, and if so, to the function block 270 along the "Y" path to print the pages 1, 3, 5, ..., N–1, and then to a decision block 278 to determine if the value of N is odd. The program at this point will flow along the "N" path to a N block 280. However, if the value of N is determined to be odd at decision block 274, the program will flow through the output of decision block 278 and to the input of a function block 282 which will print the pages 1, 3, 5, ... N.

Figure 7:
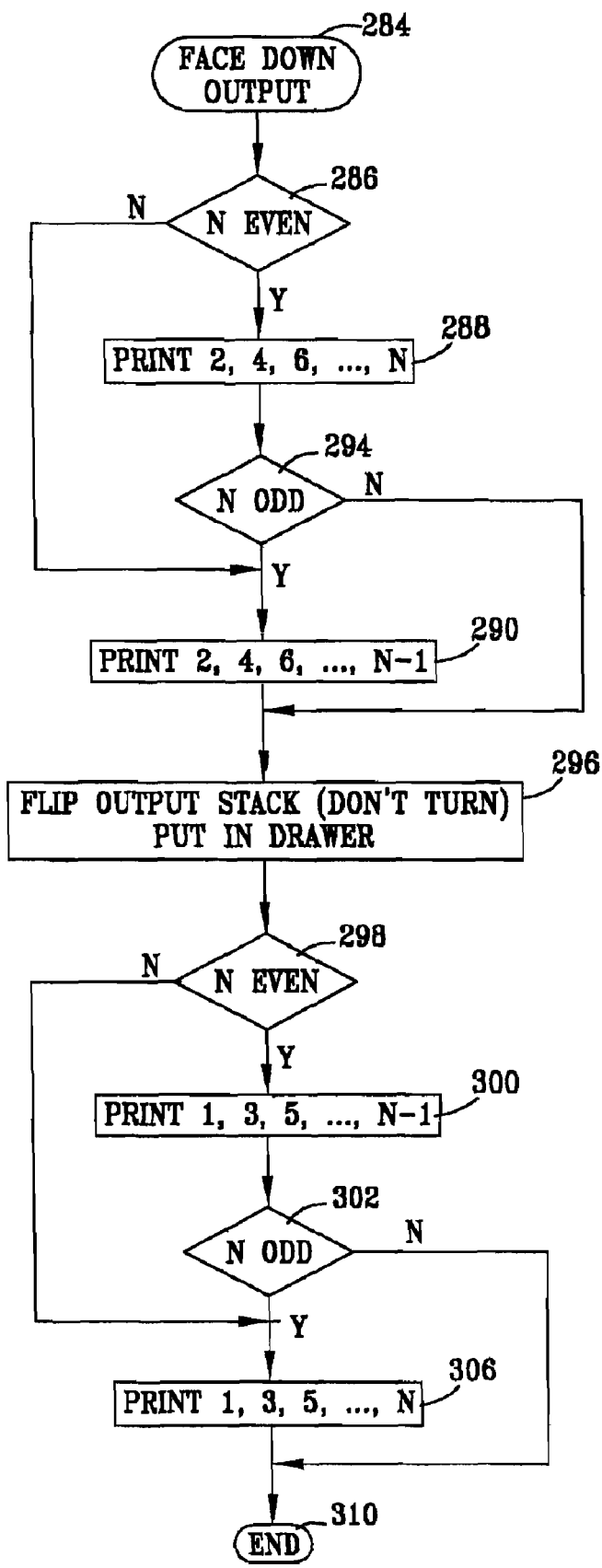
FIG. 7 illustrates a flowchart for the duplex operation for a face down output.

Referring now to FIG. 7, there is illustrated a flowchart depicting the duplex operation with a face down output, which is initiated at a block 284 and then proceeds to a decision block 286 to determine if the value of N is even. If so, the program then flows to a function block 288 along the "Y" path to print the pages 2, 4, 6, ... N. If it was determined that the value of N is odd, the program would flow along an "N" path to a function block 290 to print the pages 2, 4, 6, ... N–1. The program 288 would flow to a decision block 294, which determines if N is odd and, if not, flows along a "N" path to the output of function block 290, the output of a decision block 294 is input to function block 290. The output of function block 290 flows through a function block 296, as well as the output along the "N" path of decision block 294.

Decision block 296 indicates the manual operation wherein the user flips the output stack without turning it 180° and then inputs it back into the drawer of the printer from which it was obtained. The program will then flow to a decision block 298 to determine if the value of N is even. If so, the program flows along a "Y" path to a function block 300 and the pages 1, 3, 5, ... N–1 and then to the input of a decision block 302. If the value of N is odd, the program flows along the "N" path from decision block 298 to the output of decision block 308 and to a function block 306 to print the pages 1, 3, 5, ... N. The output of the decision block 302 along the "Y" path also flows to the function block 306 when N is even, and the flowchart flows along the "N" path to an "END" block 310, this being the path from the function block 306.

In general, to provide routing of the different images or pages to the various print engines 16 provides the ability for the system to make certain decisions about how a particular job is output. This is facilitated by the fact that each print job, when it has been initially assembled and transmitted to the system, is disassembled during the RIP operation and then buffered in the form of separate and distinct pages. With knowledge of print related information for each of the pages in a given job, additional processing can be performed on those pages.

This processing can be in the form of routing the pages to engines that are more adapted to the particular printing operation associated with that particular page. For example, a page that has no color on it would be better handled by a dedicated black and white engine as opposed to a page having color on it being handled by a color engine. Typically, color engines, although they do have a black and white mode, operate best in the color mode. Dedicated black and white engines are significantly faster than color engines operating in the black and white mode.

One example of a type of problem that occurs when attempting to handle a print job having mixed color and black and white sheets is that where a high speed black and white print engine can be provided to print black and white pages more efficiently than a color engine with black and white capability. By incorporating different types of engines as a portion of the overall virtual system in the print engine 16, a higher level of versatility will be facilitated. One reason that color engines have difficulty in switching from color to black and white is that these types of engines have an internal sequencer that must be programmed when changing printing mode (color versus black and white). To reload the sequencer requires the engine to wait for the current page to exit the fuser.

To facilitate this system, the print engines 16 are grouped into physical engines of similar characteristics. For example, a set of four color physical engines can be configured as one virtual engine and a set of four high speed black and white engines can be configured as another virtual engine. To the outside world, these virtual engines simply appear as a high speed entity (the speed is equal to the sum of the individual engines rated print speed). In this case, the outside world will see two high speed devices, one of which has color capability.

There are two methods of collation that exist in the present system, automatic and gather. In an automatic collation system, collated documents are generated and the user is then required to stack them and perform whatever finishing is required. For example, if there were 10 copies of a 6 page document, the following sequence would be printed:

1, 2, 3, 4, 5, 6
1, 2, 3, 4, 5, 6
.
.
1, 2, 3, 4, 5, 6 (10th copy)

This particular sequence will result in the collated copies being present in the output bin. Of course, the particular number of engines can be configured and controlled to determine how to most efficiently provide the collated copies. However, once the copies are in the stack, they are in a sequential collated configuration.

The gather method of collation is employed when external finishing and collation is available. In this case, all copies of each individual page must be printed before the next page in the document is printed. Therefore, without the multiple engine concept as described above, this would require one engine to perform all of the necessary copies of page 1, then the necessary copies of page 2, etc. This would result in a stack that had M sheets of page 1, followed by M sheets of page 2, etc. In the above example with the 10 copies of the 6 page document, the following sequence would be present:

1, 1, 1, 1, 1, 1, 1, 1, 1, 1, 1,
2, 2, 2, 2, 2, 2, 2, 2, 2, 2, 2
3, 3, 3, 3, 3, 3, 3, 3, 3, 3, 3
4, 4, 4, 4, 4, 4, 4, 4, 4, 4, 4
5, 5, 5, 5, 5, 5, 5, 5, 5, 5, 5
6, 6, 6, 6, 6, 6, 6, 6, 6, 6, 6

This arrangement, of course, would result in a single stack of the 6 pages, which would then be placed in the external finishing and collating hardware.

Referring now to FIG. 8, there is illustrated a diagrammatic view of the collation operation and the gather operation. In this particular example, there is illustrated an example wherein a document having "N" pages and "M" copies is to be provided for. In a collation operation, it can be seen that the final stack results in a sequence of the first page, the second page, the third page and the Nth page followed by the first page of the next copy, the second page, third of the Mth copy. This will continue for all M copies. In the gather method, the stack is configured of M of the first pages, M of the second pages and M of the third pages, only 3 pages illustrated for simplicity purposes. This will comprise a single stack.

There are instances where the gather method of collation has a significant speed advantage over the automatic collation method. Using the above noted example with 6 pages and 10 copies, assume that pages 2, 4 and 6 are color pages and pages 1, 3 and 5 are black and white pages. Also assume that it is desired to have 100 copies to notice a difference between the two operations. If the print job is to be printed with the color virtual engine, a time penalty is allotted each time the color engine is switched between the color mode and the black and white mode and back to the color mode. In one type of color engine, a Canon P320 model, this penalty is on the order of 8 seconds. In this example, the time penalty will occur between pages as follows:

1-2 black and white to color switch
2-3 color to black and white switch
4-5 black and white to color switch
5-1 color to black and white switch This will result in 32 seconds for each copy. If this is multiplied times 100 copies, it will result in almost an hour of lost time just for switching between the color and black and white modes on this engine. With a four engine virtual engine, the print distribution would look as follows:

TABLE 1

| Engine 1 | Engine 2 | Engine 3 | Engine 4 |
|---|---|---|---|
| 1-6 × 25 | 1-6 × 25 | 1-6 × 25 | 1-6 × 25 |

It can be seen from Table 1 that each physical virtual engine in the four engine virtual engine would print 25 copies of the 6 page document in the order 1, 2, 3, 4, 5, 6, such that each physical engine would have a time penalty of 25×8=200 seconds.

If the gather collation method is utilized in the above example, the pages would be divided among the engines as set forth in Table 2:

TABLE 2

| Engine 1 | Engine 2 | Engine 3 | Engine 4 |
|---|---|---|---|
| 1 × 100 | 2 × 50 | 4 × 100 | 5 × 50 |
| 2 × 50 | 3 × 100 | 5 × 50 | 6 × 100 |

In this example of Table 2, the first engine prints 100 copies of page 1 and 50 copies of page 2, engine 2 prints the other 50 copies of page 2 and 100 copies of page 3 and so on. This results in each engine only making one mode change to allot only a single 8 seconds per engine and, since they are running in parallel, it is only 8 seconds for the entire virtual engine.

A further optimization could be applied to achieve the following print sequence set forth in Table 3:

TABLE 3

| Engine 1 | Engine 2 | Engine 3 | Engine 4 |
|---|---|---|---|
| 1 × 100 | 3 × 50 | 2 × 100 | 4 × 50 |
| 3 × 50 | 5 × 100 | 4 × 50 | 6 × 100 |

In Table 3, the black and white pages have been grouped and printed on engines 1 and 2 and the color pages have been grouped and printed on engines 3 and 4. As such, there are no penalty hits due to mode changes, since each engine is never required to change modes. To achieve this configuration, of course, it is necessary to know whether or not a page contains color information. This information is determined after the RIP operation in the RIP 22, as described above.

Figure 9:
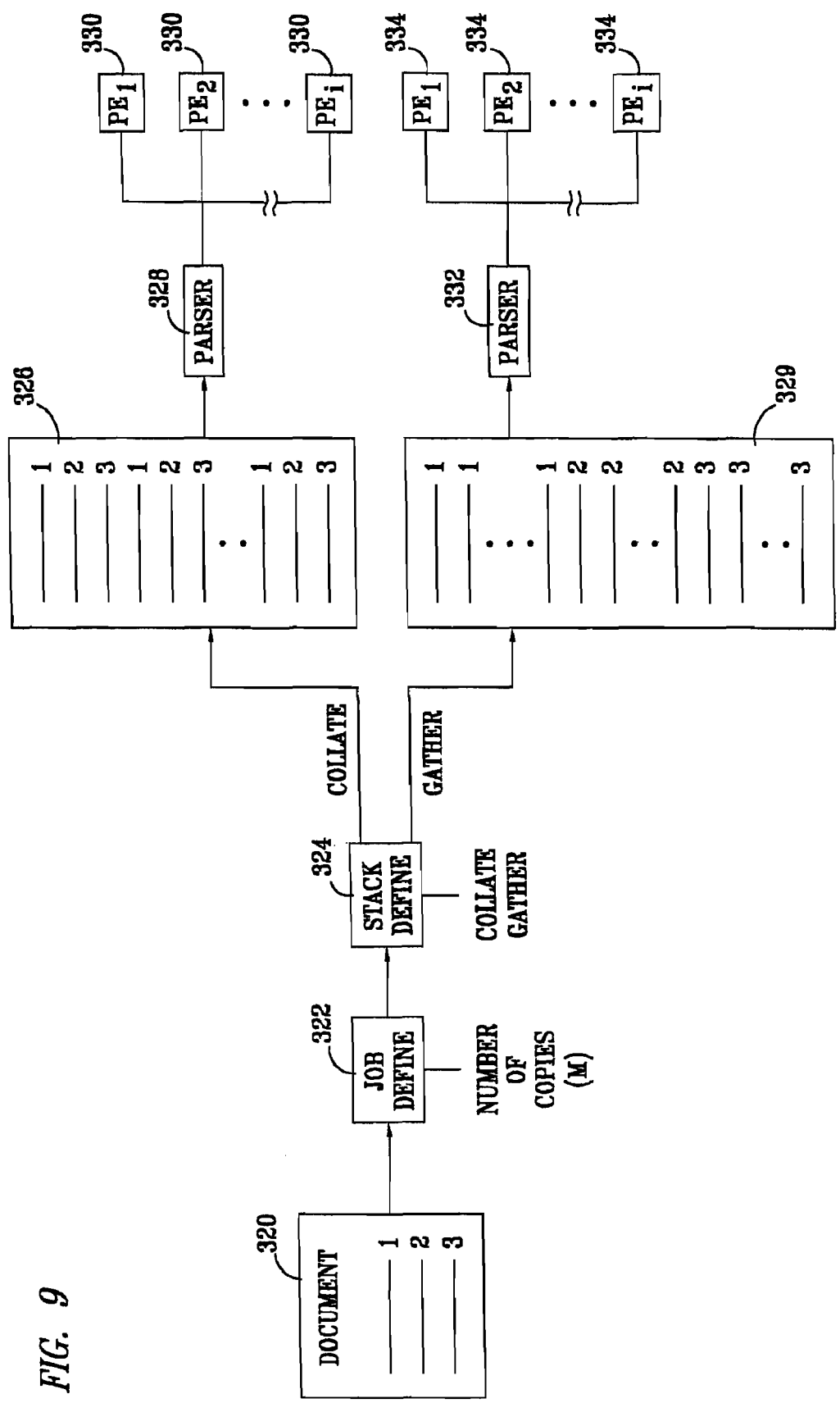
FIG. 9 illustrates a block diagram of the overall job parsing operation.

Referring now to FIG. 9, there is illustrated a block diagram illustrating the process flow for both the automatic collation operation and the gathering collation operation. A document is input to the system, as represented by a box 320, which in this example is a three page document where the value of "N" is equal to three. The next operation will be defining the job, which is represented by a box 322 wherein the number of copies "M" is defined. Thereafter, it is necessary to define the manner in which the stack will be configured. This stack is basically the overall result at the output of the engine.

Because this is a virtual print engine, multiple output bins will be utilized to form the stack. Of course, if there were a single engine, the stack would be that which results in the output bin of the single engine. With multiple engines, it is only necessary to extract the documents from each of the engines in sequence and place them into a single stack such that the overall stack will be as if it were printed with one engine.

This is defined as the image task manager (26) in FIG. 2. The operation of the stack definition will be determined to be an automatic collation or gathering collation operation. If it is automatic, the process will flow to a block 326 to place the individual pages in the correct order and then output them to a parser 328 which then distributes them to a plurality of print engines 330.

If the gather operation were selected at the stack define block 324, the stack would be defined as set forth in a block 329 which would be as described above with respect to FIG. 8, i.e., the stack would be M copies of page 1, followed by M pages of page 2 and M pages of page 3. This would be input to a parser 332 for output to a plurality of print engines 334 which are configured as a single virtual engine. By configuring them as a single virtual engine, the output bins from the print engines 334 will in fact provide the stack as defined in the box 328.

For the gathering operation, to determine how to define the parsing operation for the stack, it is necessary first to determine the number of sheets that will be present for each job. This is the number of pages in a document "N" multiplied by the number of copies "M". It is then necessary to determine how many sheets are to be accommodated by each engine which number of sheets is the value of "Q" which is defined by the following equation:

$$Q = \frac{N \times M}{E}$$

Where: M=copies
N=number of pages in the document
E=number of engines
Q=number of pages per engine in gather operation This is illustrated diagrammatically in FIG. 10 where it can be seen that the boundary for each of the print engines in the overall virtual printer (there being illustrated 4 printers) is defined such that, when finished, the outputs from each of the printers can be sequentially stacked to form the stack defined in block 328. The boundary for each of the "Q" values is something that is defined, in the present example, by equally dividing the total number of pages by the number of printers. However, the boundary could be defined as the page break. If there were 4 printers and 4 or less pages, it would be quite easy to route each page to a separate printer. It is only necessary to fix this boundary such that the right engine will get the right page. For example, if one of the printers in the set of printers defined as the virtual printer were a color printer and one page were color, the system could route the color page to that particular printer. It is then only necessary for the operator to understand that this particular configuration requires the outputs to be assembled in a predetermined manner.

Referring now to FIG. 11, there is illustrated a diagrammatic view of the overall parsing operation which is defined with a parsing block 340. This parsing block is operable to determine how the job is to be split up between the engine and this is then output in the appropriate order and stored in a page buffer 342. The page buffer then sequentially outputs the data to a block 344, which basically performs the operation of the engine manager, that is, it routes the copies to the correct print engine. The entire operation is facilitated in a manner that allows pages to be output by the parsing block 340 in a particular sequence that will match that of the engine selection. Each of the engines may not print at the same speed and, therefore, the sequence that the pages are output by the parsing block 340 may not be the exact sequence that they are input to the print engines.

Block 344 determines which pages goes to which engine and operates in conjunction with the parsing operation to provide the overall desired result. For example, one printer may be a much higher speed printer whereas the second printer may deal with a higher resolution page. Since the higher resolution pages take longer to print, it may be desirable to output a number of pages to the higher speed printer such that it completes its portion of the job prior to the lower speed printer. This will result in the parsing block 340 outputting the black and white pages initially to maintain the speed rate for the high speed printer and at a slower rate color pages for the low speed printer, such that they will be fed to the low speed printer at the appropriate rate. This allows a single page buffer 342 to be provided for all of the printers.

In another aspect of the present invention, the system is operable to divide a particular job into multiple jobs and provide "virtual job routing". When virtual job routing is utilized, the job is examined and then converted into two separate jobs, depending upon whether it may be faster to group the operations, for a job such as a mixed color and black and white job. The color job would then be defined as a single group and would be submitted to a color virtual engine, wherein the black and white job would be grouped separately and submitted to a high speed virtual engine. Each of the color virtual engines and black and white virtual engines are a combination of multiple engines. As an example, a high speed black and white engine is provided that is assumed to be four times faster than the black and white mode of the color engines. In the virtual job router, two jobs would be generated as illustrated in Tables 4 and 5.

TABLE 4

Black and White Job

| Engine 1 | Engine 2 | Engine 3 | Engine 4 |
|---|---|---|---|
| 1 × 75 | 1 × 25<br>3 × 50 | 3 × 50<br>5 × 25 | 5 × 75 |

TABLE 5

Color Job

| Engine 1 | Engine 2 | Engine 3 | Engine 4 |
|---|---|---|---|
| 2 × 75 | 2 × 25<br>4 × 50 | 4 × 50<br>6 × 25 | 6 × 75 |

In the example noted above with respect to Tables 4 and 5, it can be seen that the basic job has been divided into two completely separate jobs that will then be submitted to a job manager, with each to be completed by its respective virtual engine. This involves both error handling and other aspects that would be handled by a single printer. It can be seen from the example from Tables 4 and 5 that a significant speed advantage has been achieved by not burdening the color engines with the black and white pages. In many cases, a cost savings will also be achieved since it is cheaper to print black and white pages on a black and white engine than it is to print on a color engine. Of course, in this example, the number of color pages was equal to the number of black and white pages. In most instances, this is not the case, with the black and white pages usually outnumbering the color pages, which makes the virtual routing a more important process.

Figure 12:
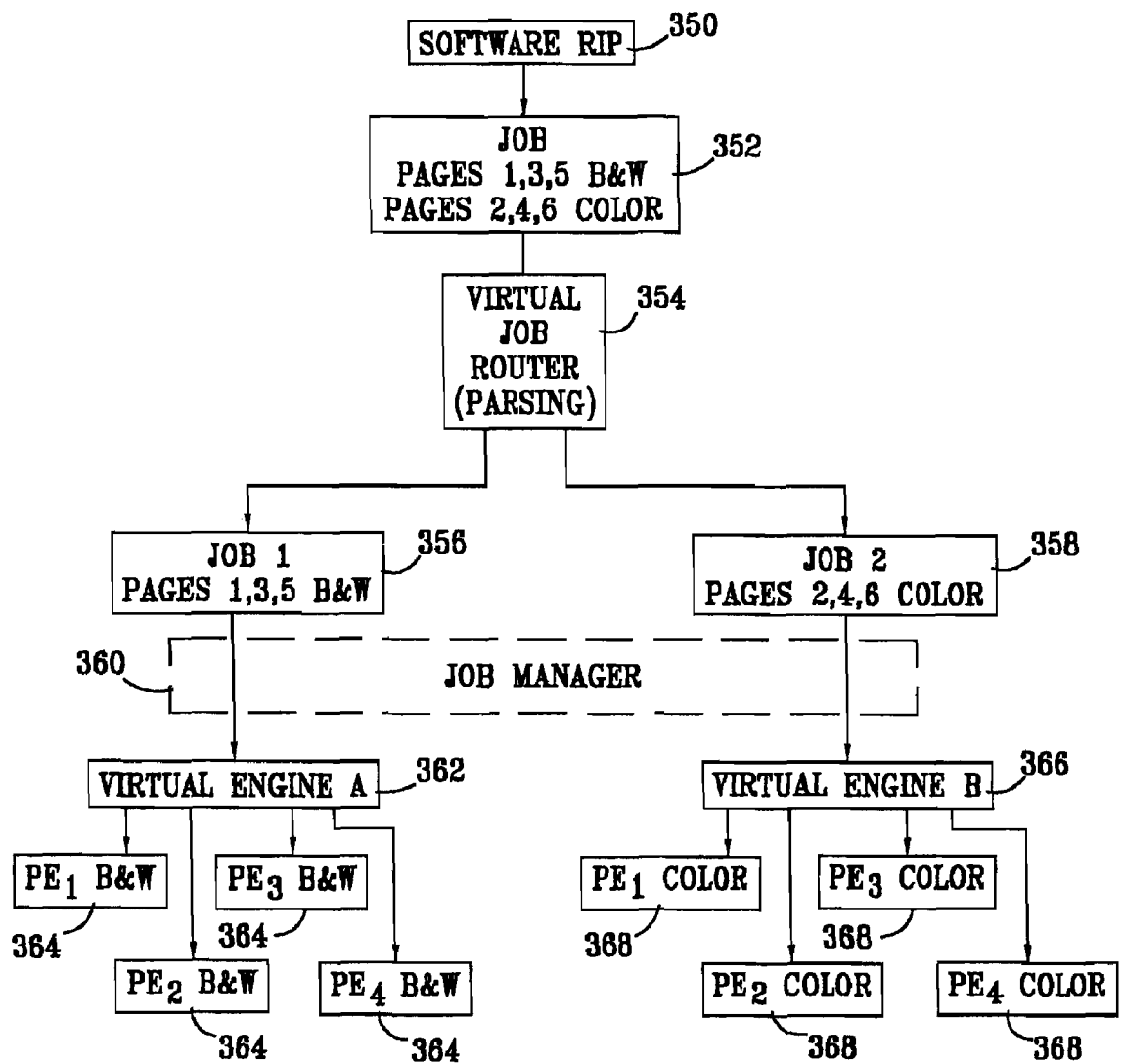
FIG. 12 illustrates a flowchart for the parsing operation.

Referring now to FIG. 12, there is illustrated a graphical representation of the process. The process is initiated at the software RIP in a block 350, which is operable to retrieve the initial multi-page document and the RIP the document into separate pages, which pages are separate and distinct and have associated therewith parameters that define the nature of the document as to printing, i.e., whether it is color or black and white, the possible resolution of it, bit depth thereof, etc. The process will then flow to a block 352, wherein the job will be defined as being a virtual job routing job and will be divided into two or more jobs.

In the present example, there is a black and white job and a color job. The process will then flow to a virtual job router block 354, which is the parsing operation. The black and white job is routed to a first job block 356 and the color job is routed to a second job block 358. Both of these jobs are handled by a job manager 360, illustrated in phantom. The job manager will route the black and white job to a first virtual engine, represented by a block 362, which has associated therewith four black and white print engines 364. The job manager will route the second job associated with the block 358 to a second virtual engine 366, having associated therewith four color print engines 368.

It should be noted that the job manager 360 will essentially perform the operation of the parsing and will ensure that pages that are extracted from the internal page buffer (not shown) will be routed to the appropriate engine in the appropriate manner and at the appropriate time. It is noteworthy that the pages will be routed to the virtual engine 362 at a much higher rate and they will be routed to the virtual engine 366, as the color engines are typically slower than the high speed black and white engines. It is only necessary that the integrity of the overall stack that was defined in the stack block 328 of FIG. 9 be maintained.

It is important to note that the print engines 334 in FIG. 9 basically will be grouped as the two virtual engines 362 and 366 when virtual job routing is utilized and the gather collation method is utilized. In general, virtual job routing will utilize the gather collation method. It should be understood, however, that the primary advantage provided by virtual job routing is that a particular page can have the parameters thereof examined after the page has been assembled separate from the initial multi-page print job, and a determination made as to how to handle that particular job. This will allow the job to be routed to the most efficient engine.

Figure 13:
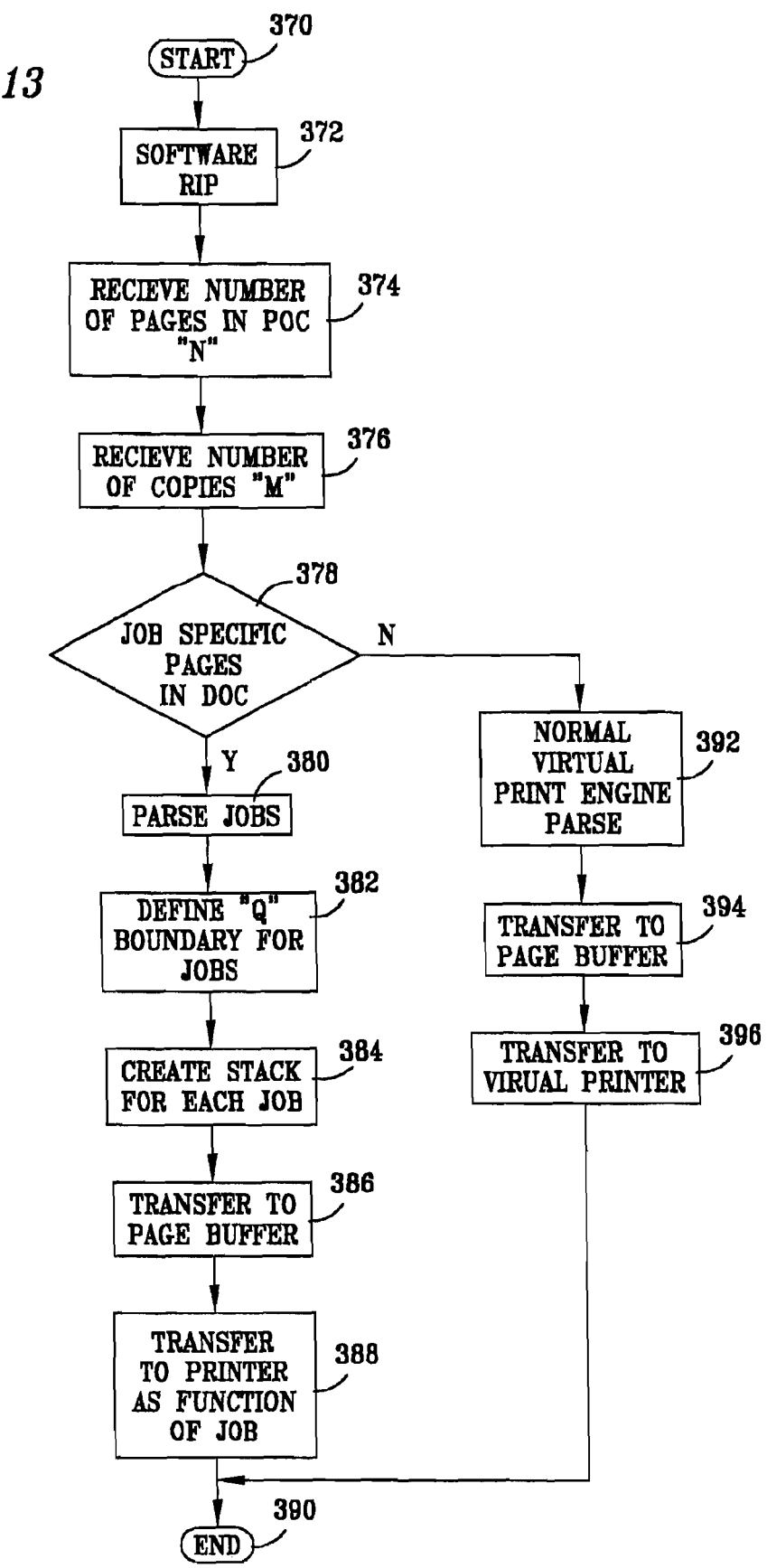
FIG. 13 illustrates a flowchart for the overall virtual job routing operation.

Referring now to FIG. 13, there is illustrated a flow chart for the overall virtual job routing operation. The flowchart is initiated at a start block 370 and then proceeds to a block 372 to perform the software RIP operation. This software RIP operation is the operation described above that allows the image for each page to be extracted out of the original input print job from the workstation to provide a stand alone page. After the document has been ripped and stored as a single page, the program then flows to a function block 374 to receive an input as to the number of pages in the document "N". The program then proceeds to a function block 376 to receive the number of copies that are to be made of the document, this being the value "M".

The program then flows to a decision block 378 to determine if the pages are determined to have job specific pages, i.e., certain pages are color and certain pages are black and white, or, alternatively, that certain pages require processing by a certain one of the print engines or a certain one of the group of print engines as a virtual job. If so, the program will flow along the "Y" path to a function block 380 to parse the jobs. The program will flow to a function block 382 to define the "Q" boundary for the jobs, i.e., how many sheets are to be routed to each engine, and then to a function block 384. Function block 384 creates the stack for each job with the defined "Q" boundaries disposed therein, which "Q" boundaries defined which portion of the stack goes to which printer. The program will then flow to a function block 386 to transfer the pages to the page buffer and then to a function block 388 to transfer the pages to the particular printer of the function of the job that is being performed and the printer that is designated. The program will then flow to an end block 390.

If the decision block 378 had determined that there were no job specific pages, the program will then flow along the "N" path and proceed with the normal virtual print engine parsing, as described above, this indicated in a function block 392. The program will then flow to a function block 394 to transfer the pages to the page buffer as a function of the parsing operation and then to a function block 396 to transfer the pages from the page buffer to the virtual printer. The program will then flow to the end block 390.

Figure 14:
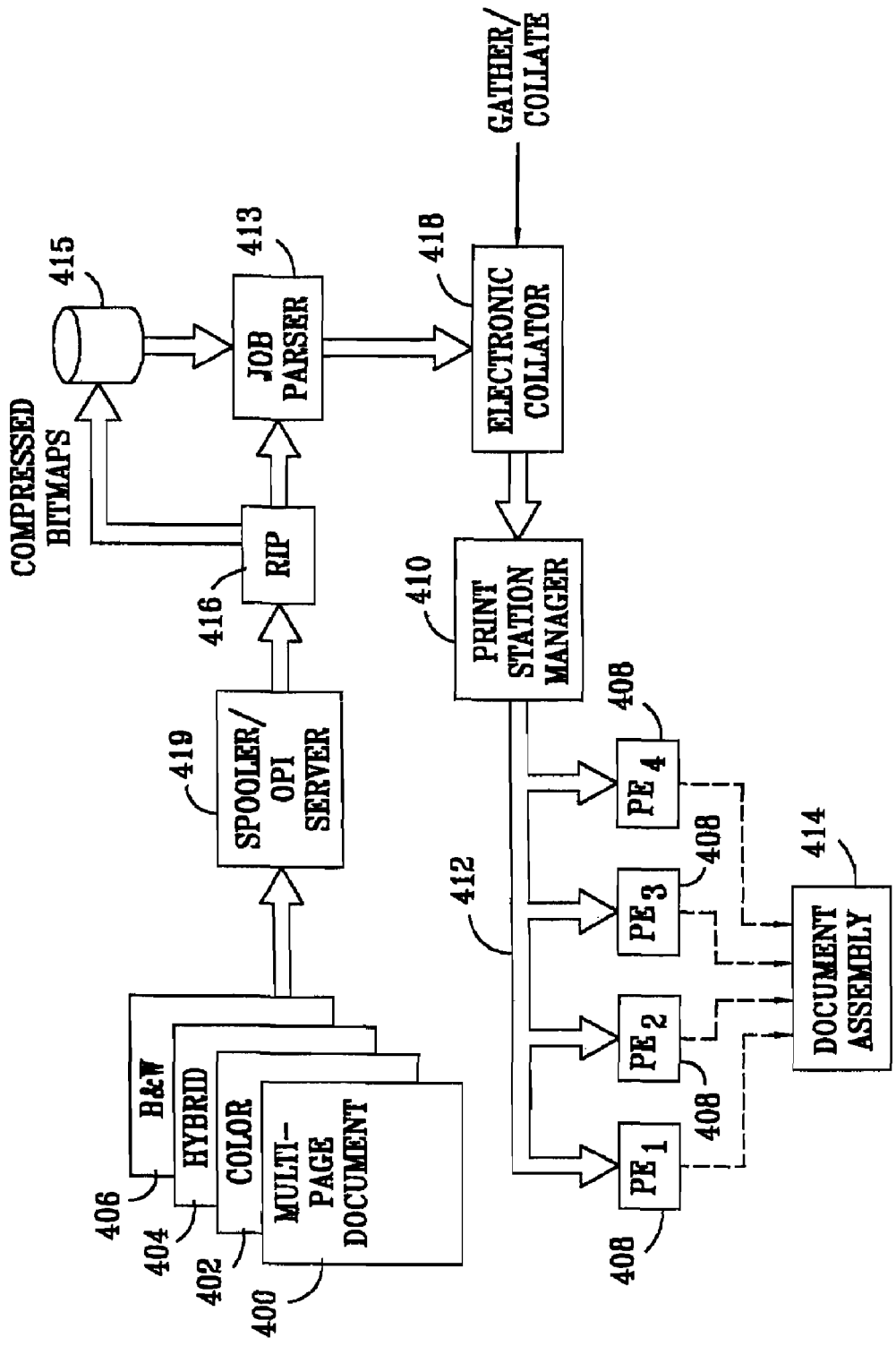
FIG. 14 illustrates an overall block diagram of the system.

Referring now to FIG. 14, there is illustrated a general block diagram of the overall system illustrating in more detail the operation of the electronic collator and the Print Station Manager. As described above, whenever a document is received, it is processed through a software RIP, such that individual bit map pages can be defined, which individual bit mat pages constitute images, which images are independent as to the print parameters associated therewith, such as color, bit resolution, bit depth, etc., but are associated with a document. In the block diagram of FIG. 14, a multi-page document is input to the system. This document is input from a PC or some type of user. In general, each of the multi-page documents constitutes a job.

In FIG. 14, there are illustrated four documents, a multi-page document 400, a color document 402, a hybrid document 404, and a black and white document 406. The multi-page document 400 may be any type of document which includes multiple pages. Document 402 is a document that is defined as operable to be printed on a color print engine. The document 404 is a hybrid document which can have black and white pages and color pages. The document 406 is in an entirely black and white document. It should be understood that the virtual print engine of the present invention is operable to convert each of the documents into single individual bit-mapped pages, which images are stored on a page-by-page basis for each document.

Thereafter, as described above, these pages are distributed to various engines in a parallel manner, depending upon the characteristics of the page, the availability of the engine and, in general, how best to match a given page in accordance with its characteristics with a given engine in accordance with that engine's characteristics. This facilitates maximum throughput through the engines and maximizes the use of the engines' capabilities.

There are illustrated four print engines 408, labeled PE1, PE2, PE3 and PE4. In a preferred embodiment, the print engines 408 are realized with a Canon P320 color laser printer print engines. Each engine is rated at 3 ppm for four-color pages and 12 ppm for black pages. In a mixed document, black-only pages are printed at 12 ppm and color pages at 3 ppm. The print engines are configured to accept letter-size (or A4) or legal-size paper and prints on only one side, although double-sided printing could be facilitated with another type of engine. In general, the print engine in the preferred embodiment utilizes a 60-to-80 micron spot and images at 600×600 dpi.

The print engines 408 are interfaced on the input side thereof with a print station manager 410 through an interconnect 412, the interconnect 412 defined above as the PCI interface, which will be described in more detail below. The print station manager 410 in general is operable to define the way in which jobs are initially assembled and reported to the printers. The output of each of the print engines 408 is basically disposed in bins associated with the print engines and these are then fed to a document assembly operation, represented by a block 414. This is any type of technique for retrieving documents from the print engine and placing them in an appropriate order. In one embodiment, this is done manually.

The Print Station Manager 410 receives the input therefrom from an electronic collator 418, which is in part described above with reference to FIG. 9 as the stack define block 324. This electronic collator 418 receives an input from a job parser 413, which is operable to retrieve pages from a memory 415, which pages are basically compressed bit maps. These compressed bit maps are oriented such that each page defines a bit mapped image, with each page having associated therewith information regarding the parameters of the page with respect to printing. These parameters define such things as resolution, bit depth, color/black and white, etc. The compressed bit maps, as described above, are derived from a software RIP 416, which interfaces with a spooler/OPI server 419. The spooler 419 is operable to receive the documents 400-406.

The software RIP 416, as described above, is a PostScript RIP created by Harlequin as the Level 2 ScriptWorks software RIP running under Windows NetWork. The configuration for this software RIP in the present embodiment requires 64 Megabits of memory and a 4-GB hard disk for storing compressed rasterized pages. In general, the software RIP can rasterize an entire job, store it on disk, and then start sending it to another recording engine, this being the preferred mode when utilizing slower recording engines and when rasterized data must be saved on disk for reuse later.

Alternatively, the RIP is operable to pass rasterized pages to the print engines at the same time it writes them to disk. This is what is referred to as the "writethrough" mode, as it effectively results in bypassing of the print queue. In cases where the engines are not able to keep up with the RIP, the system terminates transmission of data directly to the engine and continues to pass pages to the disk, from which they are fed to the engine at a later time. The bit maps are compressed utilizing a compression algorithm which is referred to as a "pack bit" compression algorithm, a conventional algorithm. These rasterized pages are available to be printed and reprinted, either on a document or a page basis, at any time.

This software RIP is operable to provide dispersed screening techniques and conventional half-tone screening techniques, in addition to a contone dot generator. The user can select which form of outlet is desired for any situation. Additionally, the software RIP rasterizes data at a variety of bit depths, from 600×600 dpi at eight bits per pixel per color for contone output to 600×1200 dpi at one bit per pixel to be screened by a screening algorithm that is proprietary to the Harlequin software RIP. When rasterizing data at 1200 dpi for output at 600 dpi, the present system utilizes the extra data to modify the laser spot utilizing the print engine's ability to modulate the beam.

The software RIP is connected to the printer via a PCI interface, as described above and which will be described in more detail below. This PCI interface will allow two engines to be connected to the PC bus and a parallel data channel associated therewith, which provides a data transfer rate of 13 megabytes per second per engine, fast enough to handle hundreds of compressed pages a minute. The PCI bus feeding these engine interfaces operates at up to 120 MB per second. The job parser 412 is operable to split virtual print engines across multiple print stations, as described above, which in conjunction with the electronic collator 418, is operable to set up and monitor queues, support "virtual printers," and provide diagnostic feedback and status of the print stations, which is received from the print engines 408.

The electronic collator 418 is, as described above, the process of rasterizing every page in a document only once and then printing the pages in order, such that no mechanical or manual collation or sorting is required on the output of the print engines 408, this being a function of the actual way in which the print engines bins are configured. The compressed bit maps are saved, such that multiple copies of the pages can be printed subsequently at the engines' full rate of speed, this being the result of rasterizing on a page-by-page basis, with no additional rasterizing being necessary for each multiple page, i.e., once a page is rasterized, it can be printed any number of times without requiring further rasterization of the original input.

The job parsing operation, as described above, is operable to determine the total number of pages in the job (the number of pages in a document times the number of copies of the document in the job), and then spread the job out "equitably" among the available engines, such that the output of one engine placed on top of the other engine yields a complete job, as if it had come out of one engine. This, of course, is a function of the number of engines utilized and the way in which their output bins are disposed. However, each of the engines is combined in a particular configuration setup that will define a virtual printer that will be associated with a particular job.

Whenever a multi-page document requires multiple pages to be printed, it is first necessary to rasterize the entire document and store it in the memory 414. Thereafter, a virtual job stack is created that has one copy on top of the other, as described above with respect to the stacks 326 and 328 in FIG. 9. Boundaries are then defined, as noted above with respect to the "gather mode" in FIG. 10, which defines which portion of the stack goes to which engine and the portions of the stack designated for those engines are routed to the engines via the distribution process, as described above with respect to block 14 in FIG. 1. The key aspect of this system is that a document is rasterized only once, but emerges as multiple copies (or gathered copies) and that the job is printed at the speed of multiple engines in parallel.

The electronic collation step is completely automatic, transparent to the operator, which operator merely directs the print station as to which job to print and how many copies are needed, the print station comprising all of the printers. This creation of the job stack and defining of boundaries of the job stack for distribution to the engines is determined in a relatively short amount of time on the order of seconds. The purpose is primarily to ensure that the resources are utilized at their maximum ability. At the completion of a press run, the operator then stacks the various output piles on top of each other to complete the collated job. Of course, as will be described below, an automatic "finishing" system could be utilized to extract the documents and put them in the appropriate stacks. It is only important that, when the stacks are defined within a given printer, there is some indication, such as a separator page, that will allow the particular stack created between separators, to be assembled with another stack from another printer in the desired print job output.

If one of the print stations, i.e., one of the print engines 408, is down, the job will automatically be reconfigured such that it is parsed over the remaining print stations. An output will then be provided to instruct the operator how to arrange the pages for pickup from the output bin.

With respect to duplex printing, duplexing can be performed by a dedicated engine or, with an engine that does not have an automatic duplex feature, a "work-and-turn" procedure is utilized. In this procedure, after the first sides are printed, the lights on the print station console blink red and send a message to reload the paper. The operator then removes the sheets printed on one side from the output of the print engine 408, turns them over and places them in the input tray. The process then prints the other side and places them into the output bins. The result is pre-sorted output of the entire job.

The operator then moves from one machine to the next, putting the sets in one collated stack. If needed, slip sheets fed from the printers' manual input trays can be inserted between jobs or between copies, these being separator sheets. This technique can be facilitated, since the system has stored the individual pages and associated with those pages information regarding which job it is associated with and the page number it is associated with. Therefore, once the job is rasterized and the compressed bit image is stored, it is only necessary to extract the even-numbered pages, print them, turn over the documents, and then print the odd-numbered pages.

By providing the page-by-page basis, this allows a merge operation to be facilitated. If the user desires, the print station manager 410 can merge pages of a "form" document with pages of another job. This is to be distinguished from a conventional word processing system in that the image formed of a bit mapped image for each page can merely be printed in a predetermined order. For example, a page from a form document could be inserted between pages 10 and 11 of a single other document, such that the final document results in page 10 being followed by the form page and then being followed by page 11. This merely requires the job stack to be redefined and redefine the output job. Of course, if two jobs are input at the same time and are to be merged, it will require initial rasterizing and storing of the jobs prior to the merging operation. If the jobs have already been rasterized and pre-stored, then it is only necessary to create the virtual job stack, which is relatively quick.

The spooler 419 is operable to optimize printing over the network. The spooler can take jobs directly from a workstation and route them either to disk or directly to the RIP 416 to begin processing. This is primarily directed toward Macintosh computers. For general IBM-compatible PCs, the jobs will go directly through the print manager on the Windows NT print manager directly to the spooler. After the jobs are rasterized by the RIP 416, they are then stored on the disk 414 prior to output to a print engine.

Jobs may be printed as contone images or screened. The spooler will publish print cues representing printer characteristics. This will then be displayed to the user as printers in the print setup menus for Windows. Also, different queues can be provided with other characteristics, such as different paper sizes or collating requirements.

Figure 15:
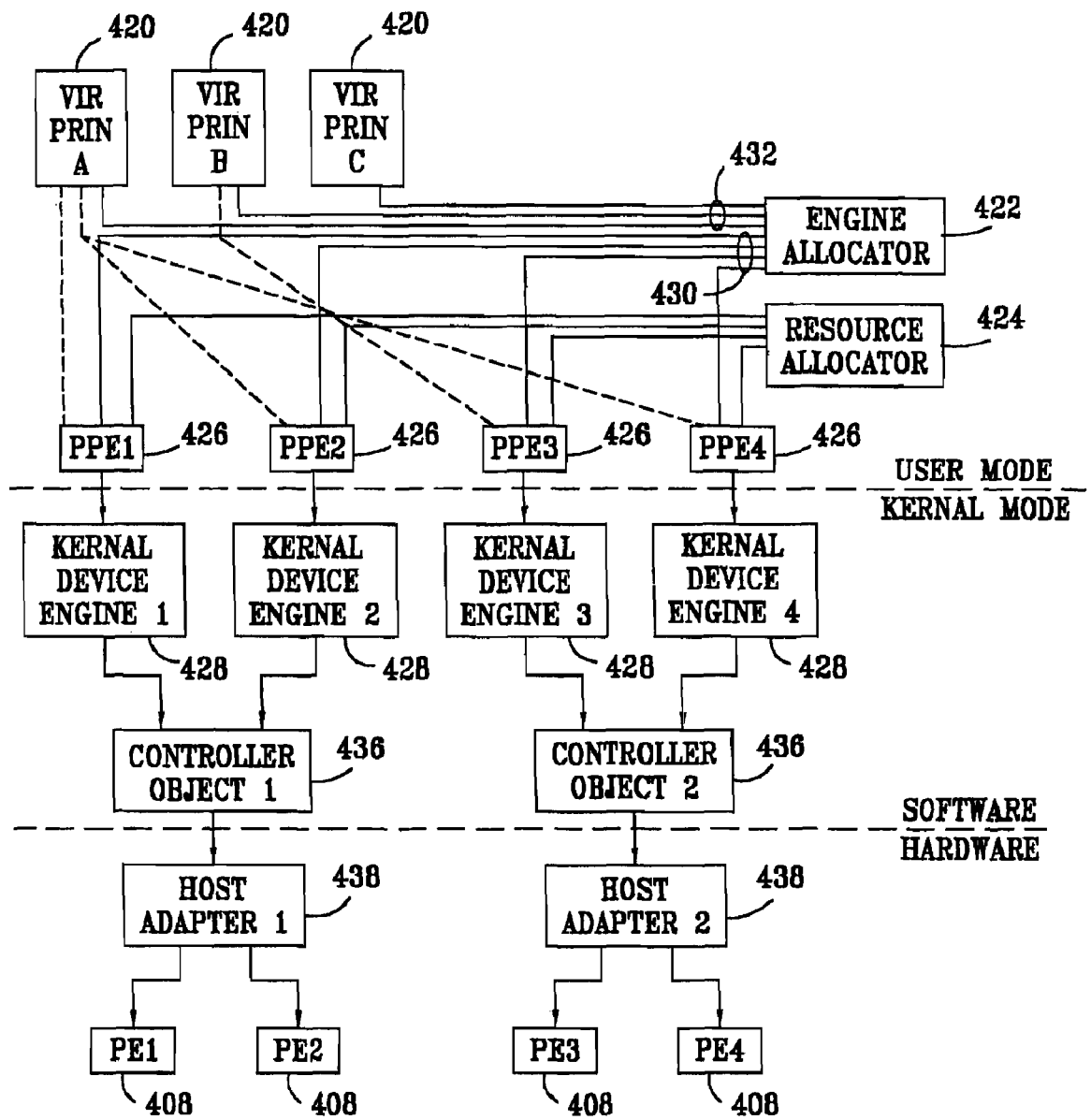
FIG. 15 illustrates a block diagram of the lower level architecture between the virtual printer and the physical print engine.

Referring now to FIG. 15, there is illustrated a block diagram of the lower level architecture between the generation of a virtual printer and the print engine 408. As described above, the virtual printer is a configuration setup in which a certain number of printers in the system are utilized together to produce a single job. Just as queues represent characteristics that affect how the RIP will process the file, the virtual printer defines the way in which the engines are configured, which affects how the RIP will feed them with the pages to the printers. Each "virtual printer" is actually one or more physical engines, which virtual printer essentially represents the print engines that are available to the RIP sending a document to be printed, i.e., the final destination is defined.

The virtual-printer system is a method to allow the user to define fewer than the entire series of printers for association with a single job, such that one or more engines are available to print a different job. Overall, each system and each different site may set up as many virtual printers as it desires with its allocated engines. For example, an operator could set up two engines as one virtual printer, the other engine as a second virtual engine, and all four engines as a third virtual printer. Then, the job could be directed from the RIP to the third virtual printer, thus using all the printers to output the same job. Alternately, two separate jobs could be printed concurrently, each using one of the first two virtual printers.

In the block diagram of FIG. 15, there are illustrated three virtual printers 420, labeled virtual printer A, virtual printer B, and virtual printer C, respectively. Associated with the virtual printers 420 are two distinct allocation systems, an engine allocator 422 and a resource allocator 424. The engine allocator 422 is responsible for managing the physical print engine resources, while the resource allocator 424 manages the memory resources. Since disk usage, CPU usage and bus bandwidth are directly related to memory usage when sending bit maps to the engines, managing memory usage effectively manages the other resources.

In general, the engine allocation block 422 is required to give each virtual printer 420 access to the print engines 408 in a controlled and predictable manner that will guarantee maximum use of each engine. The engine allocator 422 works in concert with the electronic collator 418, while the electronic collator 418 itself generates job stacks for each engine, the engine allocator 422 ensuring that there is a physical print engine 408 available to execute a particular job stack.

The resource allocator 424 has two basic functions: memory management and performance management. If a system has only a limited amount of memory, and all engines wish to utilize this memory to load bit maps at once (which contain more data than available memory), the system may cause unpredictable behavior unless the memory is managed. In some systems, it is more desirable to dedicate more memory usage (bus CPU time and bus bandwidth) to the RIP versus the physical engine or vice versa. With the resource allocator 424, this is a relatively straightforward method which can be presented as a slidebar to the user. One end of the slidebar increases engine performance while the other increases RIP/spool performance. The block diagram of 15 depicts the basic communication and data flowpath from the virtual printers 420 to the print engines 408. The virtual printer A is illustrated as utilizing print engines 408 labeled PE1, PE2, and PE4, virtual printer B is designated as utilizing only print engine 408 labeled PE 3, and virtual printer C is not printing.

Each of the print engines 408 has associated therewith in the software a physical print engine object 426, labeled PPE1, PPE2, PPE3 and PPE4, respectively. The physical print engine objects 426 provide control of the engine. All access to the print engines 408 is controlled through the PPEs 426 that are associated therewith. The PPE 426 is responsible for maintaining real-time status of the print engine and is also operable to isolate the associated print engine 408 from the remainder of the system. This permits different types of print engines to have different PPEs. New engine types can be added to the system by simply developing new PPEs. The PPE 426 maintains the physical link to the engine. A logical link is also maintained by the engine allocator 422. In this manner, if the user physically switches cables, the logical link is maintained.

Each of the PPEs 426 drives a kernel device engine 428. These are created during system utilization to develop kernel mode device objects for each printer port, with these portions then registered in the system hardware register. These kernel objects are different from PPEs. During initialization, it is a function of the engine allocator 422 to enumerate each of these physical ports, create a PPE object, and attach one per port. Once assigned a port, the PPE object then begins communication with the associated physical print engine 408 through the kernel mode device engine 428 and the associated kernel mode device object.

The engine allocator 422 will maintain a list of pointers into the PPE objects and kernel mode device objects to access status functions, as well as control functions. As such, the engine allocator 422 will be connected to the PPEs 426 through interconnections 430, which are logical interconnections to the virtual printers 420. With these connections, any routine system can request status of a physical engine 408 from the engine allocator 422. When a request for real-time status is presented to the engine allocator 422, it reads the status from the PPE 426 associated with that engine and returns to the call-in function. All status requests must go through engine allocator 422. The request can be made of logical as well as physical engines. The engine allocator 422 maintains the logical and physical mappings of each engine.

The PPE object 426 is instantiated from a derivative from the C Printer class. The C Printer class is the base class all printer objects are built upon. In a preferred embodiment, there is only a single printer class associated with the Canon P320 engine class. The interfaced printer object is the same regardless of the type of physical printer they are connected to. The PPE object isolates the rest of the system from the physical device. Each time a new device is to be connected to the system, an associated PPE class must be developed for that device.

The kernel device engines are output to a controller object 436, which is then operable to interface a host adapter 438, there being one for each two printers 408. This is essentially the PCI adapter described above.

The print engine C Printer class is, as described above, specific to the Canon P320 laser engine. This class must communicate through the kernel mode driver to the physical engine. The higher levels of communication protocol are implemented in this class, while the lower level layers are implemented in the kernel device engine 428. Since the Canon P320 does not send any unsolicited messages, the messaging protocol between the Canon P320 class and the engine is a master/slave protocol, with the engine being the slave. However, it should be understood that solicited messages can be accommodated with a different engine. In the preferred embodiment, the Canon P320 class must maintain a real-time engine status. This is accomplished via polling the engine every three seconds. Only changes are updated during this polling interval. Each time the Canon P320 class detects that the engine has been powered on or reset, an entire status update is performed.

To understand the engine allocation, the concept of "job stacks" will be further elaborated upon. A job stack is basically a dynamically sized array of instructions which is delivered to the PPE 426. Each entry in the array is defined by a number of variables. There is a Number of Copies variable, which instructs the PPE 426 to print each page a defined number of times before moving on to the next page. There is a Begin Page variable to define when the first page of a document is to print, and an End Page variable which defines the last page of the document for this instruction. A Command variable is also input, which is utilized for special commands, such as printing separation pages. In the following example in Table 6, a Command value of "0" indicates nothing, while a Command value of "1" indicates that a job separator page must be printed. Job stacks are dynamic and can contain any number of entries. The example in Table 6 utilizes a ten-page document that is to be printed with four copies utilizing three engines, with a separator page between jobs feature turned on.

TABLE 6

|  | PPE1 | PPE2 | PPE3 |
|---|---|---|---|
| Instruction 1 | 1, 1, 10, 0 | 1, 4, 10, 0 | 1, 7, 10, 0 |
| Instruction 2 | 1, 1, 3, 0 | 1, 1, 6, 0 | 1, 1, 10, 0 |
| Instruction 3 | 1, 0, 0, 1 | 1, 0, 0, 1 | 1, 0, 0, 1 |

Examining the above Table 6, it can be seen that PPE1 will print one copy of pages 1-10, followed by one copy of pages 1-3 of a document followed by a job separator. PPE2 will print one copy of pages 4-10, followed by one copy of pages 4-6 followed by a job separator. PPE3 will print one copy of pages 7-10, followed by one copy of pages 1-10, followed by a job separator. Since the printing is face-down printing, once the job is complete, the user simply takes the pages from PPE3 and stacks them on top of the pages from PPE2 (still face down), and then takes this new stack and places it on top of the pages from PPE1 for a completed and collated job.

The engine allocator 422 provides for Controlled Dynamic Engine Allocation. The goals of engine allocation are twofold: provide equitable (round-robin) allocation of engines, while at the same time maximizing the use of individual engines. Controlled engine allocation means that virtual printers consist of predefined sets of print engines and cannot utilize engines outside of the set with the predetermined job stack for a physical engine unable to be changed "on-the-fly." As an example, if Virtual Printer A consists of physical engines PE1 and PE2, it can never utilize physical engines PE3 or PE4, unless the system is reconfigured. As an example, if a virtual printer consisted of three print engines and was presented with a one-page job, it would not be efficient to tie up all three physical engines to complete this one-page job. In this case, the virtual printer 420 would submit the job to the electronic collator. The electronic collator would then return only one job stack. Since there is only one job stack, the virtual printer 420 would request only a single one of its engines.

A more complicated case to this is one that will be more common. Consider the case of two virtual printers, Virtual Printer A and Virtual Printer B, and four print engines, PE1, PE2, PE3, and PE4. Virtual Printer A consists of physical engines PE1 and PE2, while Virtual Printer B consists of physical engines PE2 and PE3. If a 100-page job is assumed, which 100-page job has been split up by the electronic collator into job stacks of 50 pages each, it is then necessary to process these with the virtual printers 420. If the jobs arrive at each of the virtual printers at the same time, one job for one of the virtual printers 420 and one job for another of the virtual printers 420, since only one virtual printer 420 can utilize PE2, the other must wait.

In this case, assume that Virtual Printer A received the job first, such that PE1 and PE2 are printing the job for Virtual Printer A. If there were no dynamic allocations provided by the engine allocator 422, PE3 would remain idle until PE2 was released. This is not desirable, since there may be more jobs behind the two mentioned, and PE3 is sitting idle, i.e., system resources are not being utilized at their maximum potential. If a user walked up to the console, he would then see several jobs waiting and an engine sitting idle.

In the controlled dynamic allocation provided by the engine allocator 422, the following sequence of events would occur. First, engines PE1 and PE2 would begin printing their 50-page job stacks for Virtual Printer A. Engine PE3 would begin printing its 50-page job stacks for Virtual Printer B for the portion that has been designated to be printed by PE3. At a later time, PE1, PE2, and PE3 would complete their job stacks at about the same time. Once PE2 is released from Virtual Printer A, it can then begin printing its job stack that was designated for being printed by Virtual Printer B. At this point, engines PE1 and PE3 are available for other jobs, thus maximizing throughput.

An important rule to note is that PE2 will print its jobs for Virtual Printer B in their entirety. Although it may seem more efficient to send a portion of the PE2 job stack to PE3 once it is released, this may not be the most efficient method for a given mode, since this would mean splitting the PE2 job stack real-time and printing part of it on PE2 and part of it on PE3. This does not provide significant advantages and can cause some collation problems when a user stacks the documents after the job has been completed. If additional jobs are waiting, the engine usage is the same and no benefit is gained. If this approach were taken, the stacking order would be disrupted in an unpredictable manner for the user, since the PE2 job stack is partially printed on PE3. However, with the use of page separators and indicators, this could be achieved. Further, if a more sophisticated finishing system other than a user stacking documents were utilized, this could be facilitated.

Each virtual printer is allowed to only have one request into the engine allocator 422 at a time. If the engine allocator 422 receives a request from a virtual printer that has already queued a request, then the request fails immediately. The requesting virtual printer must pass several bits of information to the engine allocator. For each physical engine the virtual printer wishes to utilize, it must supply a handle for the physical printer (this was obtained by performing logical to physical mapping), and a handle of an event object to signal when the engine is available. This is information that is passed in as a pointer to a list of request structures in the engine allocator 422.

It is the task of the virtual printer 420 to create a "thread" to pass the job stack to the PPE 426, these threads illustrated in FIG. 15. This thread will wait on an event that is signaled by the engine allocator. The engine allocator 422 will take the request and sort it into a separate queue for each physical engine. As soon as an engine becomes available, the engine takes the next request out of the queue and signals the event object via a SetEvent. If the SetEvent function fails and the engine allocator 424 assumes the virtual printer 420 no longer requests the engine, the engine allocator 422 will move on to the next request in that queue.

There is a separate queue for each physical printer PE1-PE4, and the queues are independent of each other. Each queue entry will consist of a handle for the virtual printer ID and the handle for the event handle. Once the virtual printer has completed a job stack on a particular printer, it must then free the physical printer by calling an engine-free handle. At this point, the engine allocator 422 will move on to the next request in that engine's queue.

Engines in an Error state are treated no differently by the engine allocator 422. It is the task of the virtual printer 420 to decide what to do with an engine in an Error state. Virtual printers can still request and be granted use of the physical engines in the Error state. If the virtual printer has no use of an engine in an Error state, it can then release this physical engine back to the system immediately. If the virtual printer determines that the Error condition will be corrected, then it can hang on to the engine and release it later. A virtual printer does not have to request all of its physical engines to print a job. If a virtual printer 420 is configured with three physical engines and only receives two job stacks back from the electronic collator, then it has the ability to only request two engines from the engine allocator.

Figure 16:
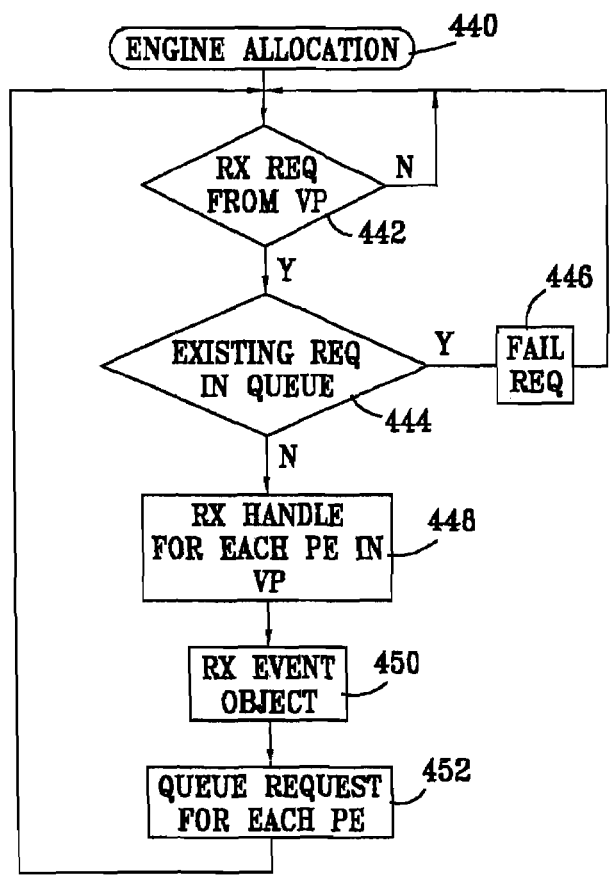
FIGS. 16, 17 and 18 illustrate flowcharts for the engine allocator.

Referring now to FIG. 16, there is illustrated a flowchart depicting the engine allocation operation for setting up the requests in the queue. This is initiated at a block 440 and then proceeds to a block 442 to determine if a request has been received from a virtual printer. If not, the program will flow back to the input thereof from the "N" path. If a request has been received, the program will flow to a decision block 444 to determine if there is an existing request for that virtual printer in the queue. If so, the program will flow along a "Y" path to a block 446 to fail the request and then back to the input of decision block 442 to wait for another request from a virtual printer.

If this is the only request by the virtual printer and it is not currently serving a request from a virtual printer, the program will flow from decision block 444 along the "N" path to a function block 440 to receive the handle for each print engine defined as being associated with the virtual printer. The program will then flow to the function block 450 to receive the event object and then to a function block 452 to queue the request for each print engine. The program will then flow back to the input of decision block 442.

Figure 17:
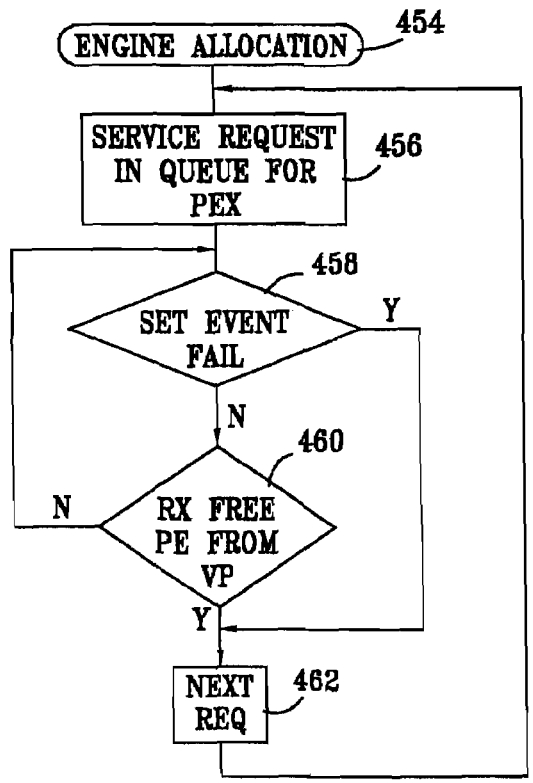

Referring now to FIG. 17, there is illustrated a flowchart depicting a portion of the engine allocation operation associated with servicing the request in the queue. This is initiated at a block 454 and then proceeds to a function block 456 to service the request in the queue for a given one of the engines. The program will then flow to a decision block 458 if the SetEvent has failed. If the SetEvent function fails, then the engine allocator will assume that the virtual printer no longer requests the engine and will flow along the "Y" path. If it has not failed, this indicates that the virtual printer still has possession of the associated physical print engine and then flows along a "N" path to decision block 460 to receive the FreeEngine handle from the virtual printer. This handle is generated once the virtual printer has completed a job stack on a particular printer. If not, the program will flow along the "N" path back to the input of decision block 450. If the engine is determined to be free, the program will flow along the "Y" path to a function block 462 to service the next request. The "Y" path from decision block 458 will also flow to the input of function block 462. After servicing the request, the program will flow back to the input of function block 456.

Figure 18:
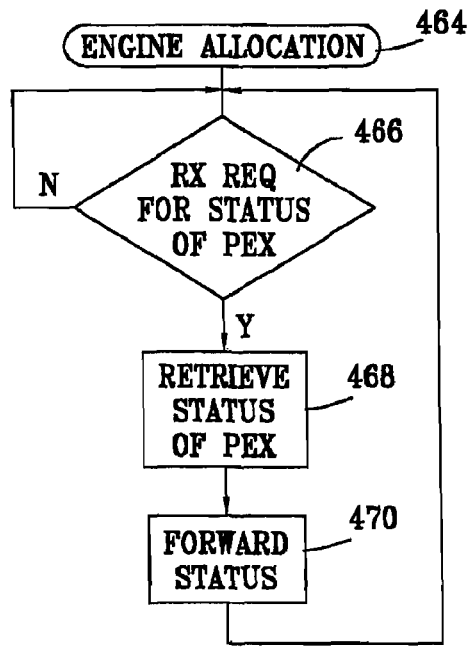

Referring now to FIG. 18, there is illustrated a flowchart depicting a portion of the engine allocation operation associated with the status request. This is initiated at a function block 464 and then flows to a decision block 466 to determine if a request for status information on a given print engine has been received. If not, the program will flow back to the input of decision block 466. If so, the program will flow along a "Y" path to a function block 468 to retrieve the status of the print engine and then to a function block 470 to forward the status to the calling routine. The program will then flow back to the input of decision block 466.

Figure 19:
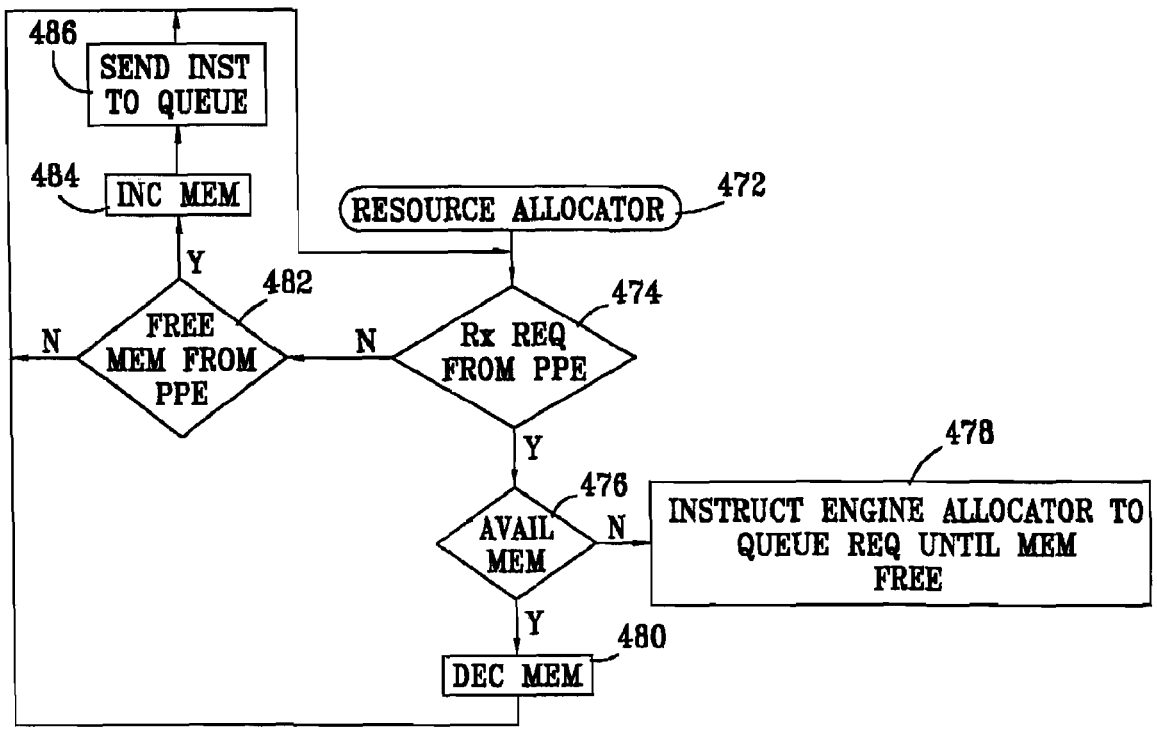
FIG. 19 illustrates a flowchart for the resource allocator.

Referring now to FIG. 19, there is illustrated a flowchart for the resource allocator. The program is initiated at a block 472 and then flows to a decision block 474 to determine if a request has been received from the PPE object. If so, the program will flow along a "Y" path to a decision block 476 to determine if there is available memory. If not, the program will flow along an "N" path to a function block 478 to instruct the engine allocator 422 to queue requests until memory is freed. If memory is available, the program will flow from the decision block 476 to a function block 480 to decrement the available memory and then back to the input of decision block 474.

If decision block 474 had determined that no request was received from the PPE, the program will flow along the "N" path to a decision block 482 to determine if an indication has been made that memory was freed from one of the PPEs. If not, the program will flow along the "N" path back to the input decision block 474. However, if additional memory had been freed from one of the PPEs, the program will flow to a function block 484 to increment the memory and then to a function block 486 to send an instruction to the queue. Basically, when a job stack is forwarded for printing and memory is unavailable, the resource allocator will place that job in a queue and it will remain in the queue until the memory is available. When the memory is available, the queue is served on a first-in-first-out basis. The program will then flow back to the input of decision block 474.

Figure 20:
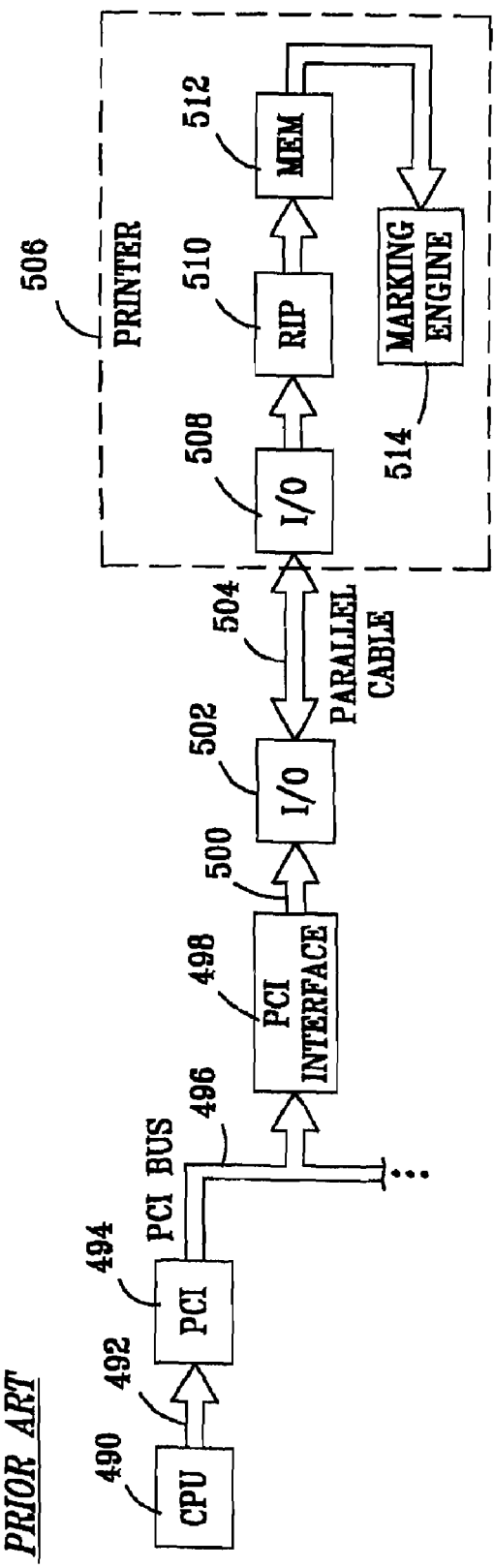
FIG. 20 illustrates a prior art PCI bus structure.

Referring now to FIG. 20, there is illustrated a block diagram of a prior art interface for a conventional PCI bus. CPU 490 is typically provided at the heart of any computing system. This typically will interface through a system bus 492 to a PCI device 494, which then interfaces to a PCI bus 496. The system bus 492 is typically a 64-bit bus, whereas the PCI bus 496 is a 32-bit bus. The PCI bus operates with a PCI protocol at a rate of 132 Megabyte/s. The PCI bus 496 is then interfaced with a PCI interface device 498 to an I/O bus 500. This then interfaces through an I/O chip 502 in a conventional manner to a parallel cable 504 and then to a printer 506. Thereafter, the printer operates in a normal convention. This normal convention is that the parallel cable is interfaced through an I/O device 508 to output data to an internal printer RIP 510 which rasterizes the data and outputs it to a memory 512 for subsequent input to the marking engine 514. This, again, is conventional in the printer 506.

PCI device 494 is basically configured of a PCI chip set which is conventional for converting the data and control information on the system bus to information in the PCI protocol. The PCI interface 498 is basically a bus mastering/ bus interface. In the present invention, this utilizes a PLX9060, manufactured by PLX Technology. In effect, PCI interface 498 and the overall PCI protocol allows data to be accepted in large bursts, thus providing relatively high throughput for data as compared to a general parallel I/O system. However, in the prior art system of FIG. 20, the RIP 510 is disposed in each printer 506, such that a PCI interface 498 is required for each printer and the data must be transferred to the printer in the form of a multi-page document, RIPPED in the printer and then output to the marking engine 514.

Figure 21:
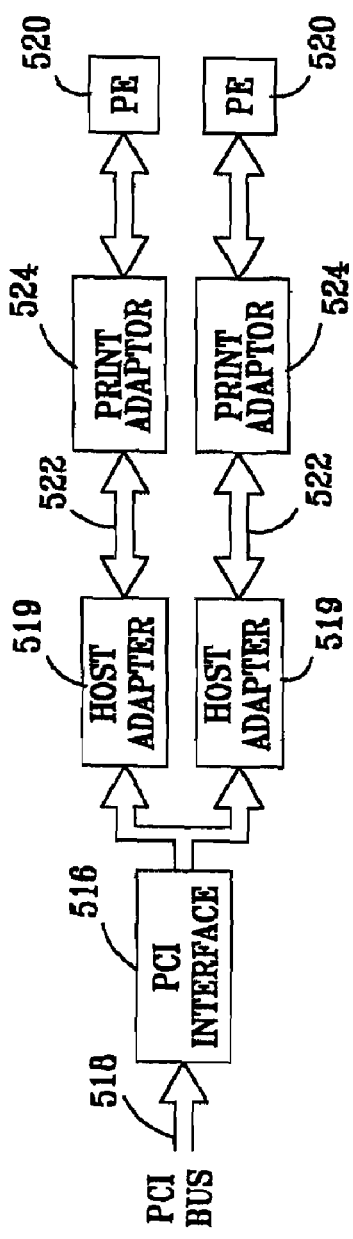
FIG. 21 illustrates a block diagram of the host adapter/print adapter of the present system.

Referring now to FIG. 21, there is illustrated a simplified block diagram of the interface of the present invention. A PCI interface device 516, similar to the PCI interface 498 in that it utilizes the same chip, is provided for interfacing with a PCI bus 518. The PCI interface then is shared by two host adapters 519 for two different printers 520. The host adapter 519 interfaces with a proprietary cable 522 and then to a print adapter 524, which is then interfaced to the printer 520. The print adapter 524 basically controls transfer of data from the cable 522 to the printer and controls the operations of the printer through various control/status lines. Status information can be returned from the printer to the PCI bus 518.

Figure 22:
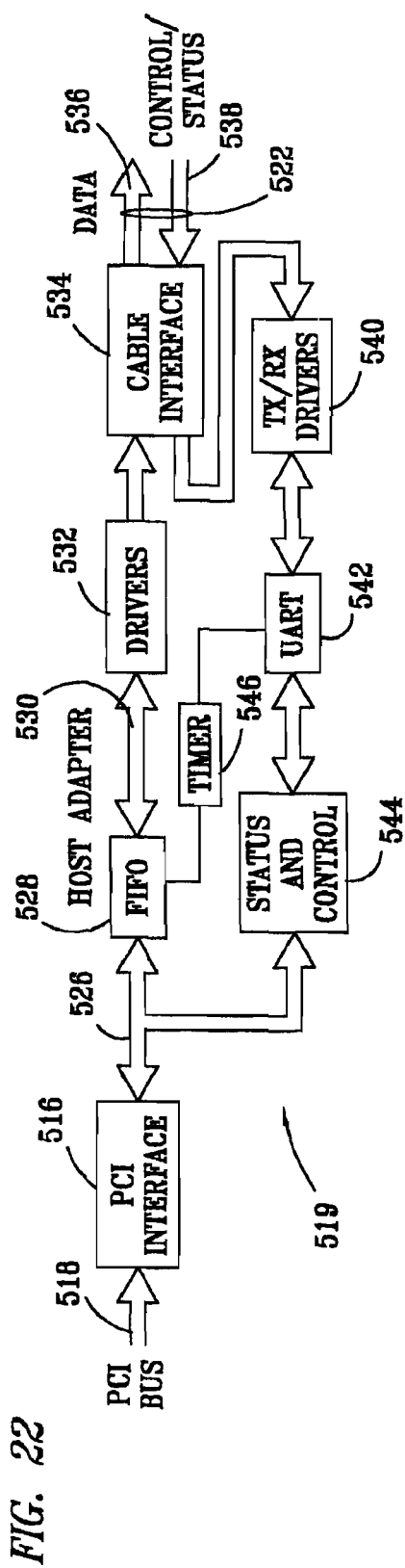
FIG. 22 illustrates a block diagram of the host adapter.

Referring now to FIG. 22, there is illustrated a block diagram of the host adapter. The PCI interface 516 is operable to interface data from the PCI bus 518 to an intermediate bus 526 which is a 32-bit bus. The data is then input to a FIFO 528, which FIFO 528 is operable to receive the data at a 32-bit word length and output the data at an 8-bit word length on an 8-bit bus 530. This is essentially a double word (32-bit) to byte (8-bit) funneling FIFO. The order of the double word to byte funneling is least significant, D7:0, first, D15:8 next, D23:16 next, and D31:24 last. The D31:0 bits have a 1-to-1 correspondence to AD31:0 of the PCI bus.

Implicit in this process is that all image data (even if it is compressed image data) must be transferred to the host adapter in multiples of double words. The 8-bit bus 530 is then input to a set of drivers 532 which will then drive the cable interface 534 to output data on a data bus 536, which forms a portion of the cable 522. Additionally, control status information is transferred over a plurality of the control/status lines 538 wherein directional drivers 540 are provided for interfacing with a UART 542. The UART is then operable to interface with a status control block 544 to interface with the bus 526 to allow communication of the status control information between the PCI and the control/status lines 538. A timer 546 is provided for controlling the timing functions for the system. The differential drivers and receivers utilized in the host adapter are the type DS903C031 and DS903C032, respectively. These devices are manufactured by National Semiconductor. The cable interface 534 is a 50 position AMP 0.8 mm CHAMP, Part No. 78796-1, with a cable 522 being a custom 16 individually shielded twister pair cable of eight meter length.

Figure 23:
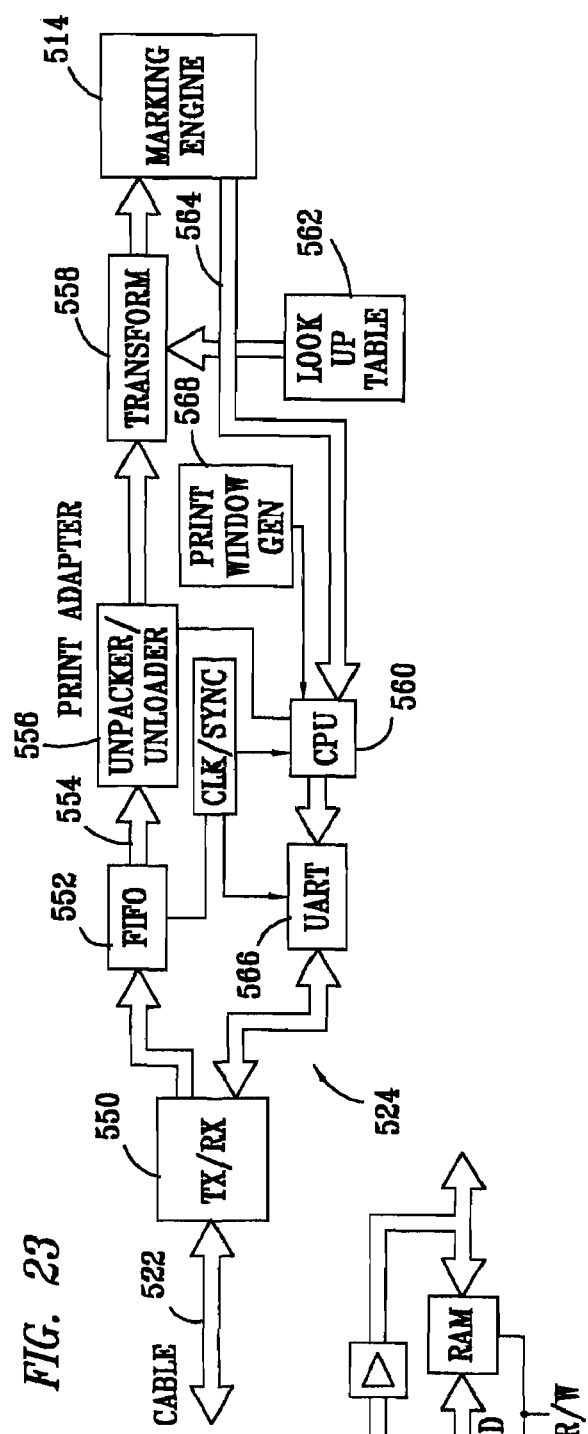
FIG. 23 illustrates a block diagram of the print adapter.
Figure 23A:
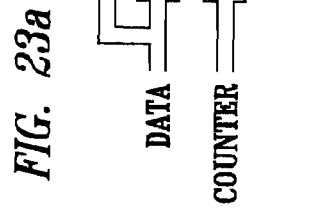
FIG. 23a illustrates a detail of the translator.

Referring now to FIG. 23, there is illustrated a block diagram for the print adapter 524. The cable 522 is interfaced through a driver/receiver 550 to a FIFO 552. The FIFO 552 is operable to provide an elastic storage capability which is then input to an internal data bus 554. The internal data bus 554 then interfaces with an unpacker/unloader 556, which is operable to retrieve the data from the FIFO 552 and then decompress this data. The entire operation is controlled by a CPU 560, which CPU 560 is operable to control the number of bits per pixel in the unpacking operation. This is then input to a transform block 558, which transform block 558 is operable to perform a calibration adjustment.

As will be described below, the engines in a given virtual printer are "color balanced." To do this, each engine is calibrated and compared to an internal master color space. The data that is transferred to the FIFO 552 is formatted in this master color space. Any aberrations of the printer due to parameters associated with a given engine that may yield to wear, etc., can be compensated for in this calibration procedure. Once calibration is complete, a look-up table 562 is loaded with calibration information, which calibration information is then utilized by the transform block 558 to correct the color space. This data is then input to the marking engine 514.

The CPU 560 also interfaces with the marking engine 514 through a control/status bus 564. This control/status information can then be read by the CPU 560 to a UART 566, which interfaces with the cable 522 through the driver/receiver 550. Control information can then be transferred between the cable 522 and the CPU 560, such that the marking engine 514 can be controlled and status information requested from the marking engine 514.

Each print adapter connects to a host adapter using a custom cable assembly that consists of 16 individually shielded balanced twisted pair conductors (one unused pair).

| Name | No. Of Pairs | Input/Output (@HostAdapter) |
|---|---|---|
| PxD7:0 | 8 | Out: Date |
| PCLKx | 1 | Out: Clock |
| PWEx | 1 | Out: Printer Write Enable |
| HTXDx | 1 | Out: Host Tx (status) |
| HRXDx | 1 | In: Host Rx (status) |
| PAFx | 1 | In: Printer Almost Full Flag |
| EOPx | 1 | In: End of Plane (Data extracted out for page -- used for page sync) |
| FLUSHx | 1/15 | Out: Resets state of print adapter | x => A or B

HostAdapter to PrintAdapter Cable Differential Pair Definitions

| | |
|---|---|
| PxD7:0+<br>PxD7:0− | Printer Image Data, D7 is MSB, D0 is LSB, sense is positive true, and is clocked into the PrintAdapter buffer FIFO on the positive transition PCKx. |
| PCKx+<br>PCKx− | Printer Buffer FIFO Load Clock, used to clock image data into PrintAdapter Buffer FIFO. Setup and hold times of image data are reference to the positive transition of this signal. |
| PAFx+<br>PAFx− | Printer Buffer FIFO Almost Full Flag, sense is negative true. The HostAdapter will stop transmitting data and de-assert PWEx within 4 positive transitions of PCKx. |
| PWEx+<br>PWEx− | Printer Buffer FIFO Write Enable, sense is negative true. This signal is used to enable the loading of a synchronous FIFO on the PrintAdapter with image data. When this signal is asserted, image data should be accepted by the PrintAdapter on the positive transition of PCKx. |
| HTXDx+<br>HTXDx− | HostAdapter Asynchronous Start/Stop Transmit Data, sense is positive true, i.e., the start bit is a logical flow. The asynchronous data rate is 9600 Baud. The form is one stop bit and no parity. |
| HRXDx+<br>HRXDx− | HostAdapter Asynchronous Start/Stop Receive Data, sense is positive true, i.e., the start bit is a logical low. The asynchronous data rate is 9600 Baud. The form is one stop bit and no parity. |

-continued

| | |
|---|---|
| EOPx+ EOPx− | End of Plane Pulse, sense is positive true. Asserting this signal for at least 3 positive transitions of PCKx will result in an interrupt being generated on the PCI bus by the HostAdapter (interrupt support logic must have the EOP interrupt unmasked). |
| FLUSH+ FLUSH− | Printer Buffer FIFO and Support Circuitry Reset, sense is negative true. This signal should be used by the PrintAdapter to flush the image data FIFO and to re-initialize image generation circuitry. |

Figure 24:
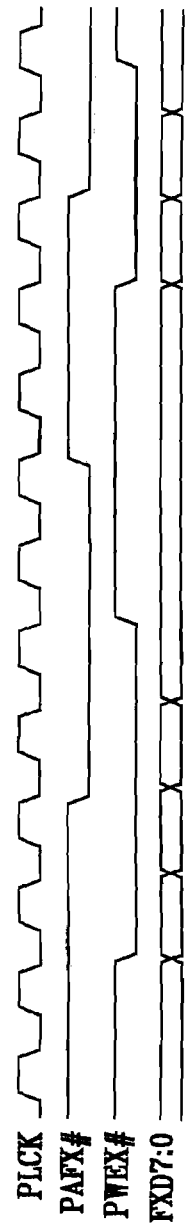
FIG. 24 illustrates a timing diagram for the unload operation of the FIFO in the print adapter.

Referring now to FIG. 24, there is illustrated a timing diagram illustrating a typical host adapter unload sequence. The frequency of the clock is 13.75 Megahertz. As will be described below, there is a command FLUSHx, which is an output from the system to the printer that is operable to reset the state of the print adapter. This is utilized for a situation where there is no page synchronization. The FLUSH operation is operable to flush the FIFO 552 in the print adapter between pages, such that there is a clean state. This occurs at the end of a plane (or page) after the EOPx signal is generated by the print adapter.

With page synchronization, on the other hand, information is provided that indicates that the FIFO 552 is flushed and the print adapter is ready to receive a new page of information. Page synchronization also provides for counting the number of pages to determine how many pages have been printed. If a page is not received in a predetermined amount of time, then an Error condition is generated. At the EOPx, the system then looks at the FIFO 552 to determine if it is empty. If it is not empty, this indicates that all the information has not been transferred from the FIFO and, thus, an error is indicated. In any event, this indicates to the system that a given page has not been printed and either this page needs to be reprinted or sent to another engine. To facilitate this page synchronization, of course, it is necessary to know what the status of the printed page is when the end-of-page signal is generated. If page synchronization is not utilized, the FLUSH signal is utilized to ensure that an error occurring on one page does not carry over to the next page.

Figure 25:
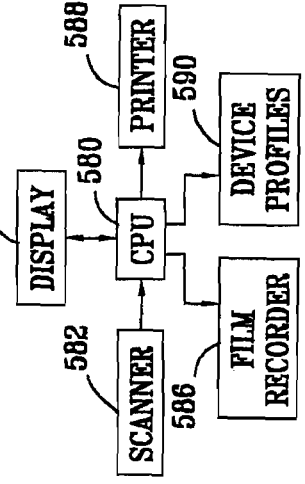
FIG. 25 illustrates a block diagram of the manner in which the device profiles are handled in a prior art system.

Referring now to FIG. 25, there is illustrated a block diagram of a prior art method for handling color spaces. CPU 580 is provided which interfaces with a number of different color devices, a scanner 582, a display 584, a film recorder 586 and a printer 588. Due to color balancing, most systems have used what are referred to as "device profiles" which resulted from a color management system specification that was created by the International Color Consortium (ICC). These device profiles are typically generated by the manufacturer, or in some cases, by the user, which describes the color characters of a particular device.

Therefore, each of the devices 582-588 would have a device profile associated therewith, which is stored in a block 590. These device profiles are provided for allowing an input from a scanner 582 to either be displayed on display 584 or to be printed on printer 588, with a translation being performed therebetween that utilizes the color independent space as the intermediate. The actual transformation is performed by the CPU 580, which reads the device profile link and performs the mathematics necessary to transform from one native space to another. This, of course, occurs on the user's machine and it results in a significant speed impediment.

Figure 26:
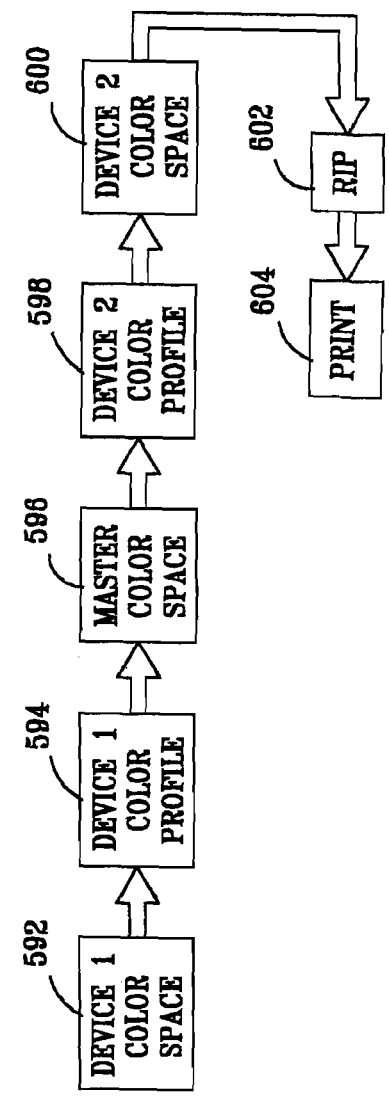
FIG. 26 illustrates a block diagram of a conventional system for balancing color space.

Referring now to FIG. 26, there is illustrated a block diagram of the prior art process flow. The input device that is being mapped to the output device is illustrated as having a first color space in a block 592. This is then mapped through the device one color profile in a block 594 to a master color space, the XYZ color space, in a block 596. This is then mapped through the device two color profile in a block 598 to the device two color space, in a block 600. At this point, the color space should be acceptable for printing and it is then routed to the printer through the RIP 602 and to the marking engine 604.

However, this must be performed prior to the RIP operation, which RIP will rasterize each of the pages for input to the marking engine 604. However, there is one significant disadvantage to this type of operation when processing pages in accordance with the multiple printing virtual print engine concept described above. This is the fact that, first, the operation is performed prior to rasterization and, second, that it must be performed for each page; that is, each time a job is created and sent to the printer, the translation must be performed. Further, when utilizing multiple printers, as in the present system, then this matching or balancing must be performed for each printer. This creates some difficulties, in that the printers are not necessarily defined prior to the RIP operation but, rather, after the pages are ripped and stored.

Figure 27:
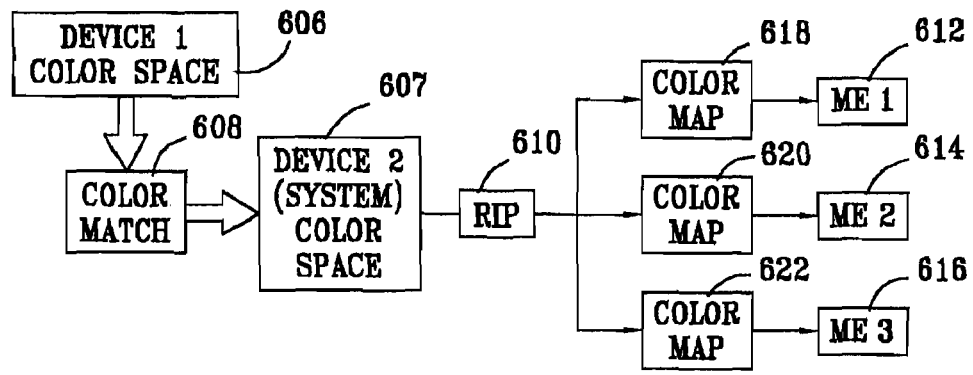
FIG. 27 illustrates the color balancing operation of the present invention.

Referring now to FIG. 27, there is illustrated a block diagram of the balancing method of the present invention. The input device exists in the device one color space, as represented by a block 606. This is mapped to a system color space in a block 607 through a color matching algorithm in a block 608. This matching algorithm is basically that described above with respect to the operations performed between blocks 592 and 600 in FIG. 26; that is, device one color space is first converted to the master color space, the XYZ color space, and then mapped from the XYZ color space to the system color space in block 607. The system color space, in the present invention, is basically the device profile of the generic printer that is utilized in the system.

Therefore, if the Canon C320 engine were utilized in the system, then that would constitute the system color space. Therefore, the device one color space would be mapped through its device one color space to the master color space and then through the Canon C320 color profile to the system color space. This constitutes a reference color space. Of course, if all of the engines are calibrated and operated identical, then any engine in any Canon C320 engine on the system would print identical to another. However, this is not the case, since all engines print slightly different. As such, each would have a slightly different color profile which would have to either be iteratively determined or defined by the manufacturer. This is difficult if not impossible to implement.

In the present system, the system color space is defined as being that for a standard printer, which is defined prior to the RIP operation. During the RIP operation, in the preferred embodiment, the color matching operation performed is a part of the RIP operation, such that after going through a RIP operation, as illustrated by a block 610, there will be rasterized images for each page of a document that have been color balanced to the system color space. This rasterized image will then be routed to the desired engine via the methods described above with respect to the virtual printers and physical print engine objects, etc.

The marking engines in FIG. 27 are illustrated as being three marking engines 612, 614 and 616. Each of the engines 612-616 has associated therewith a color mapping block 618, 620 and 622, respectively. Each of these color mapping blocks 618-622 is operable to adjust the color of the bit mapped image that is forwarded thereto to account for aberrations in the marking engines 612-616 as compared to the standard engine which was utilized to generate the device profile used to convert all color spaces to the system color space. This color mapping function is a calibrated function, which will be described below. This is facilitated with the use of the lookup table 562 described herein above with reference to FIG. 23.

The color mapping devices 618-622 allow each of the engines 612-616 to be mapped to the system color space after the RIP operation. The mapping process, as will be described in more detail below, first renders the engines linear in response, such that similar changes in density are achieved for similar changes in data. This is a combination of an internal linearization algorithm that runs on power up and an additional linearization added.

This process utilizes a manual gamma calibration which is facilitated by setting the lookup table to a 1:1 ratio with no calibration difference between the system color space and that of the printer and then running a test pattern therethrough. The test pattern is then examined with a colorimeter to determine if the printed image represents the image that should have been printed. If not, an offset is determined and stored in the lookup table. For contone images, there are typically 256 values. Each of these values can have a mapping value associated therewith, such that when a bit value is input to one of the color mapping devices 618-622, the value in the lookup table is an output. For example, if a value of 255 were input and the lookup table determined that it should be 217, then a value of 217 would be output to the marking engine.

Figure 28:
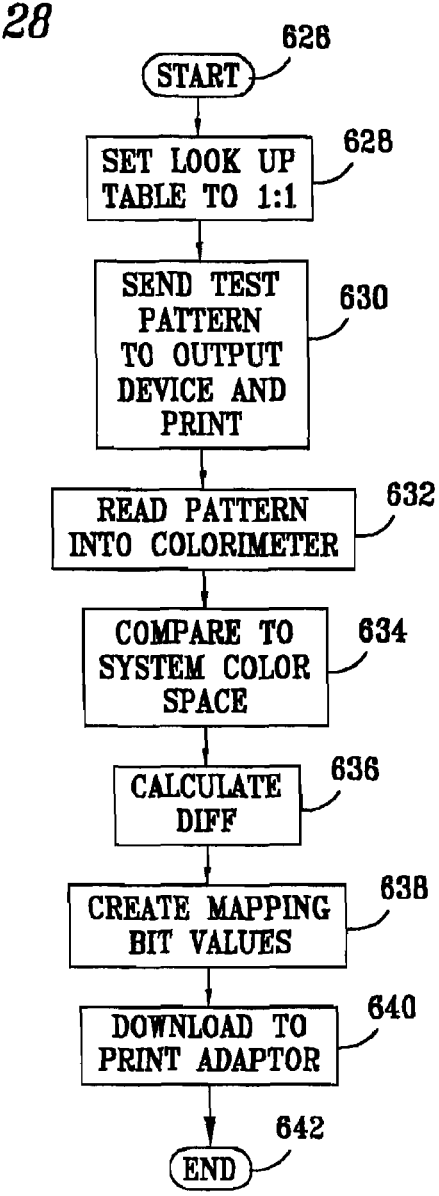
FIG. 28 illustrates a flowchart depicting the calibration method.

Referring now to FIG. 28, there is illustrated a flowchart depicting the operation wherein the lookup table is created. The flowchart is initiated at a block 626 and then proceeds to a block 628 to set the lookup table to a 1:1 ratio, such that when an 8 bit value is input to the transform block 558 of FIG. 23, the same 8 bit value is output. The program then flows to a function block 630, wherein a test pattern is set to the output device and printed. This test pattern consists of four bands of 256 steps each, each step being a different density of toner, associated with each of the expected 8 bit values. These 8 bit values extend from 0 to 256.

In general, the 8 bit values for each of the colors cyan, magenta, yellow are equal. The program then flows to a function block 632, wherein this pattern is read into the calorimeter. The colorimeter is of the type X-rite DTP51 colorimeter. This is to be distinguished from a densitometer, which measures only the reflectants from a surface to determine density. The colorimeter is based upon measurement of wavelength and determines the percentage of the XYZ space, this being "device independent" color. As such, different devices can have the same density reading with a densitometer, but a different percentage reading with the calorimeter.

The colorimeter will basically determine a value for each of the spaces and provide an output therefor. The program will then flow to a function block 634 to compare the output of the calorimeter to the system color space values that would be expected to be on the colorimeter. There is a standard table that is provided for the colorimetric values that are associated with an 8 bit input value. For example, if the maximum density at the 8 bit value of 255 were found associated with that generated when an 8 bit value of 217 was input to the printer, then one would expect that the generation of an 8 bit value of 217 would result in the correct output color. This would in effect be the mapping function which is determined by taking the difference in a function block 636 and then creating the mapping values in a function block 638.

These mapped values are then downloaded to the print adapter in the lookup table 562, as indicated by a function block 640, and then the program flows to an end block 642. For each printer, this procedure can be followed to determine the lookup table values, which lookup table values will operate on each "dot" that is to be generated by the printer and at each color. The table that is generated for the calorimetric values is already linearized in the generation of that table, which table was generated in an iterative manner. The lookup table 562 in conjunction with the transform 558 can therefore provide a constraint on the output density as a function of the bit value input.

The above noted procedure is acceptable for color balancing contone images, but there are some aspects of bi-level and quad-level techniques that may provide a problem, since the different levels are achieved by spacing dots over a given area, each of the dots generated at the maximum pixel value. Therefore, there is an additional adjustment that is provided for bi-level and quad-level printing formats. This is an adjustment to the maximum pixel value of 255 that is generated, this defines the maximum density value for the printer.

Figure 29:
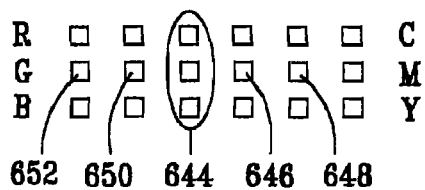
FIG. 29 illustrates an example of a test pattern.

To determine how this value is to be adjusted, a test pattern as illustrated in FIG. 29 is developed. It essentially is a series of patches with the center patches 644 being at a 50% level such that they are equal portions of cyan, magenta and yellow. These, in an ideal printer, would provide a gray patch. However, if there are any aberrations in the printer, this gray will not be true gray. The patches are adjusted, such that as the patterns move to the right in the center location, another patch 646 will be present with 50% cyan, 51% magenta and 50% yellow. The next patch to the right, a patch 648, will have 50% cyan, 52% magenta and 50% yellow. If one moves to the left in the center row, the first patch 650 will have 51% cyan, 50% magenta and 51% yellow. The next patch 652 in the center row will have 52% cyan, 50% magenta and 52% yellow. This gradual change will be noticeable to the eye and the user need only select which patch appears to be the true gray. This is then input to the system and the system makes an adjustment in a percentage of the density, which will be provided as a compensation factor in the lookup table whenever bi-level is utilized.

Figure 30:
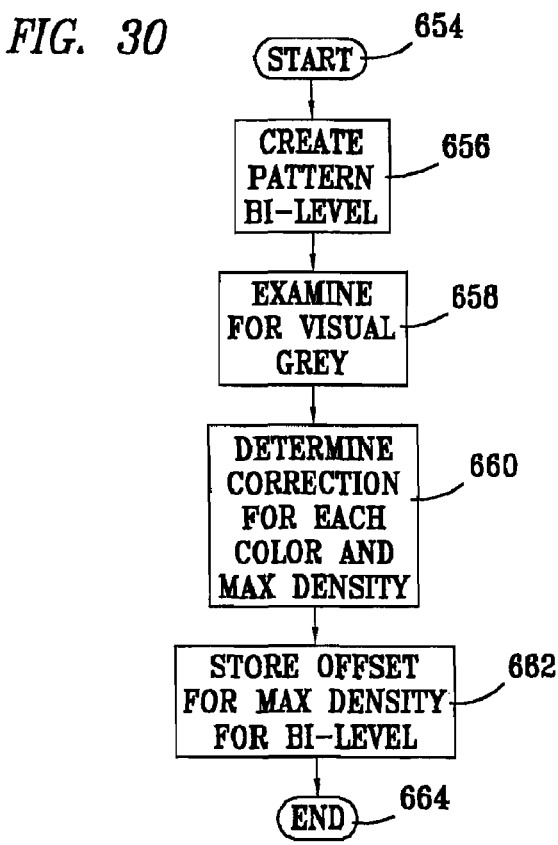
FIG. 30 illustrates a flow chart depicting the bi-level method test.

FIG. 30 illustrates the above noted operation with respect to the calibration procedure for bi-level and quad-level starts 654 by first creating 656 the pattern for the bi-level test. The patches are visually examined 658 for the most perceptively gray patch. The correction factor is then determined 660 for each color at maximum density. This correction is then stored 660 as an offset for maximum density at the bi-level and quad-level formats.

Figure 31:
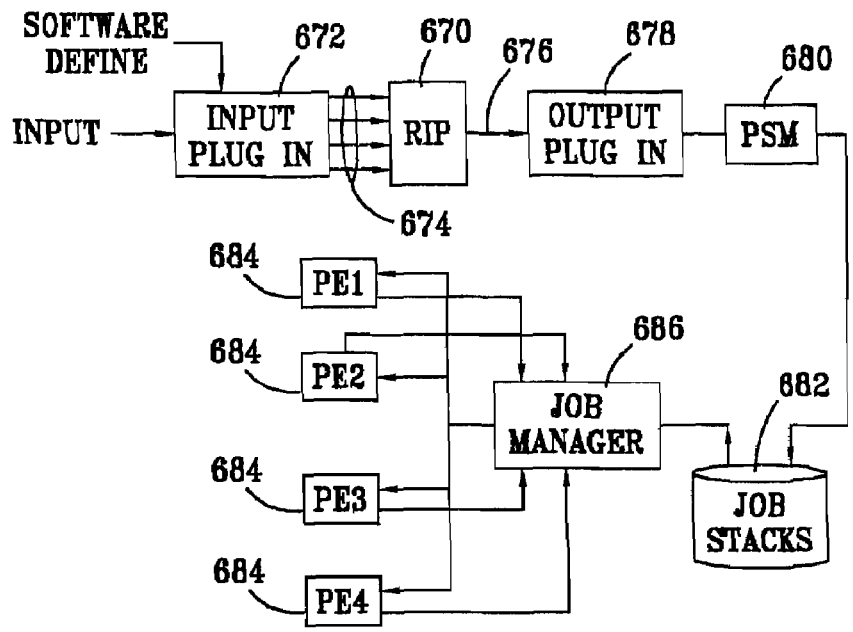
FIG. 31 illustrates a block diagram of the RIP.

Referring now to FIG. 31, there is illustrated a block diagram of the software RIP described above. In general, the RIP is a conventional RIP which is defined by a block 670. The RIP 670 is a commercially available RIP which is utilized to rasterize received pages. The particular software RIP utilized in the present invention has the ability to perform the RIP operation depending upon the type of document that is received. If a contone image is received, it is RIPPED in one method, a color input is RIPPED in another method, a black and white job is RIPPED in another manner, as is a PostScript file and a PCL file.

The RIP 670 has associated therewith on the input an input plug-in which is added at input plug-in 672, which is an added software interface. This interfaces with the input and allows the software to define how the RIP 670 is to be configured. There are provided a multiplicity of channels 674 that define that configuration, each channel defining a particular configuration, i.e., a contone configuration, a black and white configuration, etc. The RIP 670 is then operable to provide the rasterized pages on an output 676 which interface with an output plug-in 678. The RIP 670, in addition to providing a rasterized image, also provides output information as to bit depth, resolution, number of pixels per line, etc. This information is provided to the output plug-in 678, which then forwards this information to a Print Station Manager (PSM) 680. This information is utilized to generate a page header for each page.

This page header will define such things as the bit depth of the page, the page size, the number of colors, the number of planes, and the resolution, in addition to information regarding duplex and simplex printing. These are the characteristics of the particular page. This is then followed by the raw data which defines the bit values for the bit mapping image. The information associated with this raw data and the raw data are then stored and pointers placed in the Print Station Manager to allow this image to be later located. This image, of course, is also associated with job information, such that the page number of a given job is known. The Print Station Managers can utilize this to retrieve these jobs at a later time and manipulate them in any manner to determine how they will be printed, the order in which they will be printed, etc.

After the Print Station Manager has received the information from the output plug-in 678, this information is then stored and later retrieved. A part of the PSM 680 is the electronic collator described above. This electronic collator is operable to generate virtual stacks for the document, which virtual stack correlates with the potential output configuration of the printers, which virtual stack will be directly mapped into that output configuration. For example, if there were four printers with four bins, each bin disposed over one on top of the other, the virtual stack would represent the stack that results in the four bins. In this manner, when the user pulls and stacks the contents of the bins, the stack will look identical to the virtual stack. This virtual stack is then divided up into job stacks, which are then buffered in a buffer area 682 for routing to print engines 684 under the control of the print engine objects (PPE) described above.

A job manager 686 manages the operation of this. In general, the job manager 686 works on a job stack level, whereas the PPE operates on a single page level. The PPE, in conjunction with the resource allocator, will look at the next instruction in the job stack and execute that instruction by fetching the particular page and printing that particular page. The PPE will also look at status information and define if an error exists, which will be relayed to the job manager 686. The job manager 686 can then process this error to reroute the remaining portion of the stack to a different printer or reroute the entire job stack to a different printer. Therefore, the job manager 686 monitors the error information and routes the stack to the appropriate engine, if necessary.

Figure 32:
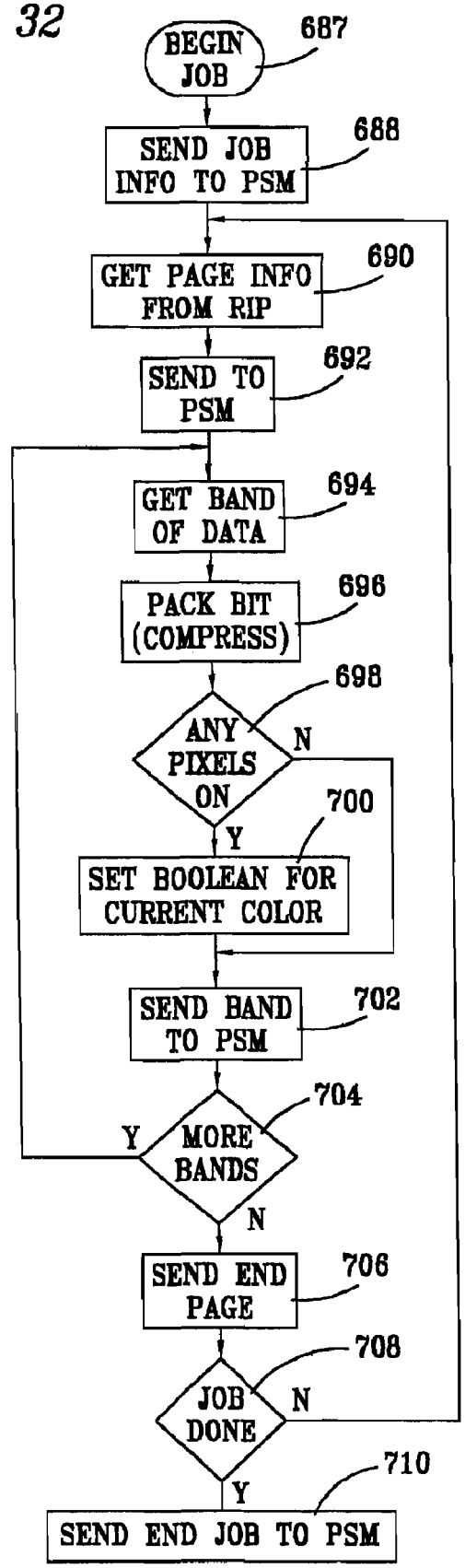
FIG. 32 illustrates a flowchart for the output plug-in portion of the RIP.

Referring now to FIG. 32, there is illustrated a flowchart depicting the operation of the output plug-in. The flowchart is initiated at a block 687 and then flows to a function block 688 to send the job information to the PSM. The program then flows to a function block 690 to retrieve the page information from the RIP, which is then sent to the PSM, as indicated by the function block 692. The program then flows to the function block 694 to retrieve a band of the raw data, this being the rasterized data. This band of data is essentially a small portion of the RIPPED page for all four color planes. This band of data is then compressed, as indicated by a function block 696. The purpose for performing the compression prior to forwarding to the PSM for storage is that this PSM 680 can be facilitated at a different location and compression facilitates throughput to a different location. After compression, the program will flow to a decision 698 to determine if any of the pixels in the different color planes are on. If so, the program will flow to a function block 700 along a "Y" path to set a Boolean for the current color. This is essentially flagged and indicates that there is a color present in that particular plane.

If it were determined that the color planes did not have any pixels turned on, this would indicate that this was a black-and-white job. If this were the case, the program would flow along the "N" path to the output of the function block 700 for all pixels in the plane. The lack of this Boolean in the PSM would indicate that it was a black-and-white job and could therefore be processed in a more rapid manner. Once it is determined whether the Boolean should be set or that there are no pixels on the color plane, the program will flow to a function block 702 to send the band data to the PSM, with the information regarding the Boolean. The program will then flow to a decision block 704 to determine if there are more bands.

If so, the program will flow back to the input of function block 694 to retrieve another band of data and, if not, the program will flow to a function block 706 to send an End Page message to the PSM. The program will then flow to a decision block 708 to determine if the job is complete. If not, the program will flow back to the input of function block 690 to get the page information for the next page. When the job is done, the program will flow to the function block 710 to send an End of Job message to the PSM.

To ascertain the toner level in each of the printer engines, the present invention utilizes a system whereby the actual rasterized image is evaluated as to the amount of toner that it will require. This is accumulated over a job stack which will be sent to a given printer. Once the job stack has been printed, an accumulation register is decremented indicating that the toner value has decreased for that particular print engine. Additionally, the accumulator can be examined prior to printing the job, but after rasterizing and determining the amount of toner that will be required, such that it can be determined whether there is sufficient toner available to run the print operation on that printer for that particular job stack.

Figure 33:
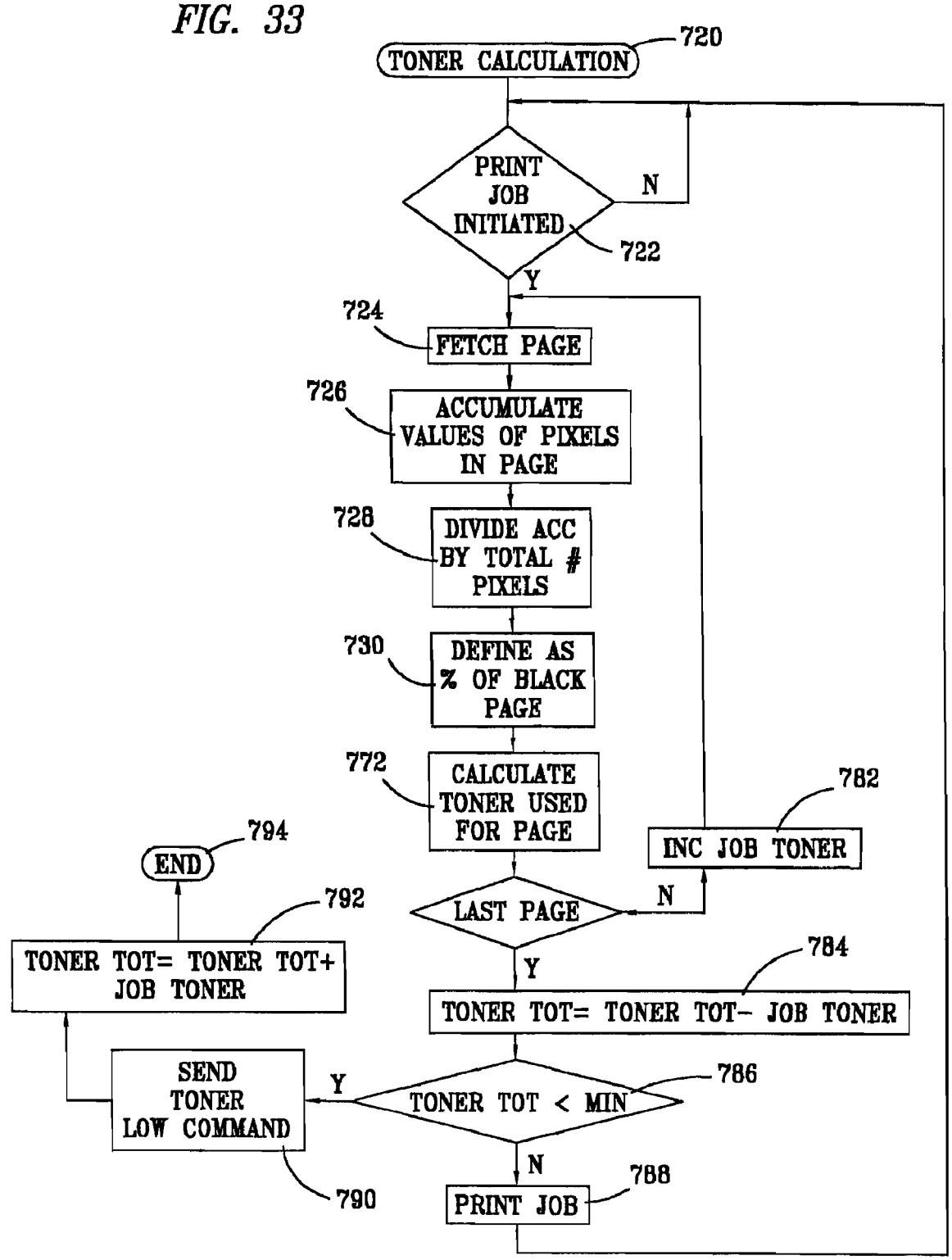
FIG. 33 illustrates a flowchart for the toner calculation operation.

Referring now to FIG. 33, there is illustrated a flowchart depicting the toner calculation operation. The flowchart is initiated at a block 720 and then proceeds to a decision block 722 to determine if a print job has been initiated. If not, the program will loop back around to the input. If so, the program will flow to the function block 724 to fetch a page of information for the given job and then to a function block 726 to accumulate values of pixels in that page. Each pixel will have a value that ranges from zero to 255 and these are summed up for the entire page. The program then flows to a function block 728 to divide the accumulated value by the total number of pixels in the page. This will provide the average value. If, for example, all the pixels were turned on to their maximum value, this average value would be 255.

However, if only half of the pixels were turned on to full maximum value, the value would be 128. The program then flows to a function block 730 to define the value as a percentage of the black page. If it is 100 percent, that means all pixels are turned on to their maximum value. Any pixels that are turned off or have a lower value will lower this percentage. The program then flows to a function block 772 to calculate the toner utilized for the given page, i.e., this percentage will be multiplied by the maximum toner that will be required for that page for each color plane. It should be noted that in a color printer there are four toners, cyan, magenta, yellow and black. The toner usage for each plane will be calculated, such that if a given one of the toner cartridges for a given color is depleted, this can be indicated.

After the toner use for a given page is calculated, the program will flow to a decision block 780 to determine if the last page in the job has been processed. If not, the program will flow along a "N" path to a function block 782 to increment the job toner value, this being the total toner utilized for a given job. This will be divided up into the job stacks, as the job stacks are the smallest number of pages that will be sent to one of the multiple printers during a print job, the multiple printers defining the virtual printer. The program will then flow to the input of function block 724 to fetch the next page.

After the last page of the job, the program will flow along a "Y" path to a function block 784 to set the total toner value equal to the previous toner total value minus the job toner value, and the program will then flow to a decision block 786 to determine if the total toner value is less than a minimum value. If not, the program will flow to a function block 788, print the job, and then back to the input of decision block 722. If the total toner value is determined to have decreased below a minimum value, the program will flow to a function block 790 to send a toner low command to the user. The program will then flow to a function block 792 to reset the total toner value equal to the total toner value plus the job toner value, i.e., the value before function block 784. The program will then flow to an end block 794. Along this path to the N block 794, the printer will be inhibited from printing that particular job stack. Once this error signal is returned to the job manager, the job manager can then generate an overall default or it can merely reroute the job to another one of the printers defined in the virtual printer with an error separator page provided thereby.

In general, the provision of the accumulated total toner value in a register provides, in effect, a "gas gauge" or "toner gauge" for a given toner module. This total toner value will be reset when a new toner is placed in the system. It will be reset to a value that approximates the known toner level. Additionally, characteristics of the toner module and the toner associated therewith in combination with the characteristics of the print engine will be utilized to calculate the amount of toner that is deposited on a sheet of paper with all pixels on to their maximum value. This is relatively easy to determine by running continuous pages through the printer until the toner has depleted to a value that is below an acceptable level. This will provide the total amount of toner output for a given number of pages, which will be proportional to that for a single page. This can then be divided down by the determined average value. This provides a significant advantage, in that it is an actual value, as opposed to an estimated value based upon the input print job. This is facilitated due to the fact that the rasterized image for each page in the job is collected prior to the job being printed. By comparison, conventional systems would have no method for determining usage of toner, since the rasterized image is developed in the printer after the processing section.

In an alternate mode of operation, the toner level determination can be utilized to make a determination as to whether to print a particular page. This determination is made as a function of either the cost of a document or the level of toner in a particular print engine. In a first example, consider a large document that has multiple colors associated therewith. The user can input information as to cost of the toner as a criteria for printing. If the amount of toner can be determined prior to printing, then the amount of toner required for a particular job can be determined. With information as to the amount of toner required and the cost of the toner, the total cost of the job can be determined prior to actually printing the job. If the cost is too great, then the printing operation can be terminated. This can only be facilitated by a system that can make a fairly accurate estimation of the amount of toner that is required for a particular job.

In a second example, consider a situation wherein there is a printing job that is ongoing and there is a determination made that the toner has fallen below an acceptable level. At this point, the print job can be terminated at that engine and the remainder of the job routed to another printer, or the entire job can be rerouted to another printer. This can only be facilitated with a system that has the capability to determine toner usage coupled with a system that can dynamically reroute pages to be printed.

In a third example, the determined toner level can be utilized to set the number of pages to be printed. When the job is evaluated prior to printing to determine the toner requirements, then the remaining toner for the target printer is compared to the total toner required. If there is insufficient toner available for the total job, then only the number of pages for which there is available toner will be printed. This can only be facilitated with a system that has the ability to print select pages after a determination of toner requirement is made.

Figure 34:
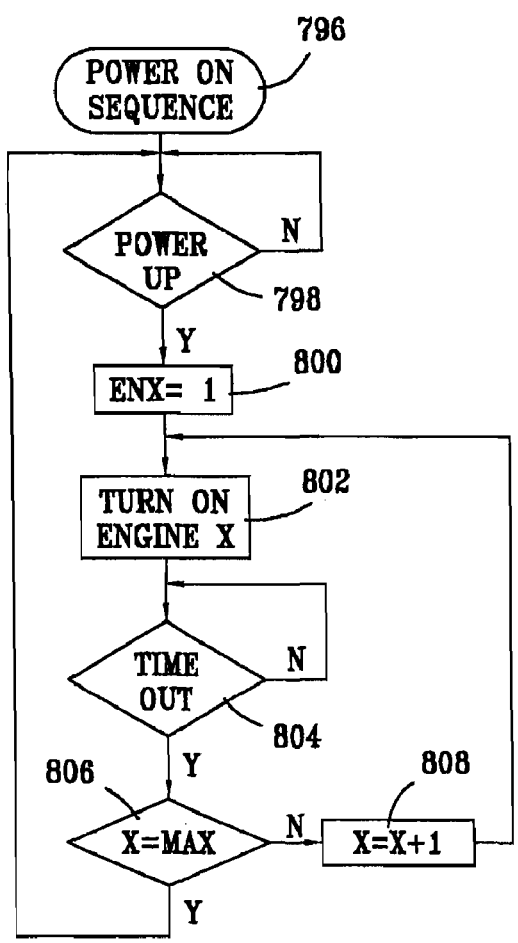
FIG. 34 illustrates a flowchart for the power-on sequence operation.

Referring now to FIG. 34, there is illustrated a block diagram depicting a power on sequence, which is initiated at a block 796 and then proceeds to a decision block 798. Decision block 798 determines whether a power on condition has occurred, i.e., whether the system has been turned on. If not, the program will flow back to the input of decision block 790 and, if so, the program will flow to a function block 800 to set a variable "x" equal to "1." The program will then flow to a function block 802 to turn on engine "X" and then to decision block 804 to determine if a timeout has occurred. This program will loop back to the input of decision block 804 for approximately 10 to 15 seconds. At this time, the program will flow to a decision block 806 to determine if the value of "x" is equal to a maximum value. If not, the program flows to a function block 808 to increment the value of "x" and then back to the input of function block 802. When the value of "x" has reached its maximum value, the program will flow along the "Y" path to the input of decision block 798.

The power-on sequence is utilized to minimize power requirements for multiple print engines with multiple fusers. These fusers utilize heater lamps that have low resistance characteristics when the filaments are cold. Therefore, when the filaments are initially powered, a current surge will result from a cold start. As soon as the lamp filament temperature climbs appreciably, only several seconds or less, the current through the lamp stabilizes. The initial current pulse is much greater than the average current at a given temperature. Multiple (two or more) lamps on a single circuit could blow a breaker if the lamps are all started at the same time from a cold start. By sequencing the power-on operation, the software can control each of the engines, since the print adapter allows control/status information to be transferred between the printer and the processing section.

Figure 35:
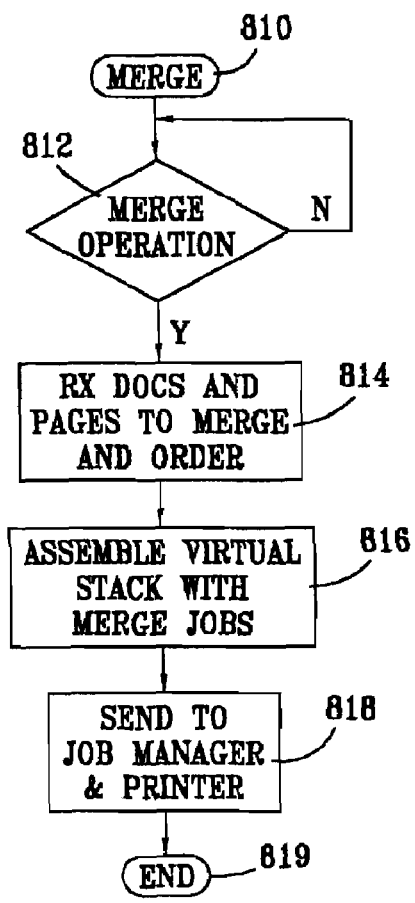
FIG. 35 illustrates a flowchart for the merge operation.

Referring now to FIG. 35, there is illustrated a flowchart depicting the merge operation, which is initiated at a block 810 and then proceeds to a decision block 812 to determine if the merge operation is to be performed. A merge operation, as described briefly above, is an operation wherein the Print Station Manager determines that two or more jobs are to be merged. Since the pages have already been rasterized and stored, it is not necessary to go through the RIP operation again. It is merely necessary to recreate a virtual job stack inserting the appropriate pages from one job into another job in the appropriate location. Of course, it must be understood that these are rasterized images. Of interest is the fact that these pages have associated therewith different printer characteristics.

For example, a 600×600 DPI job could be merged with a 600×1200 DPI job. Since each page has associated therewith its own resolution, bit depth, page size, etc., the Print Station Manager need only send the job stack to a given printer with the PPE object then controlling the operation via the page.

Since the command information is associated with the page, each page can be treated differently by the PPE object and the print engine. Therefore, a print engine could print one page at the 600×600 DPI level and the following page at the 600× 1200 DPI level. Even in the event that a color page were mixed with a black-and-white page, the color page would be sent to the color printer, followed by the black-and-white page sent to the same color printer (although separate printers could be utilized with automatic finishing steps described below), such that the color printer will first perform a color operation followed by a black-and-white operation.

Once the merge operation has been determined, the program will flow along a "Y" path to a function block 814 to receive the documents and pages to merge and the order thereof, this determined by the Print Station Manager. The program will then flow to a function block 816 to assemble the virtual job stack with the merge documents. This will create a hybrid job. The hybrid job and the associated virtual stack will then be divided into individual job stacks for the engines and then forwarded to the job manager and the printer, as indicated by function block 818. The program will then flow to the end block 819, as the remaining portion of the system in the form of the PPI objects and the kernel device drivers will take care of the printing at that time.

Figure 36:
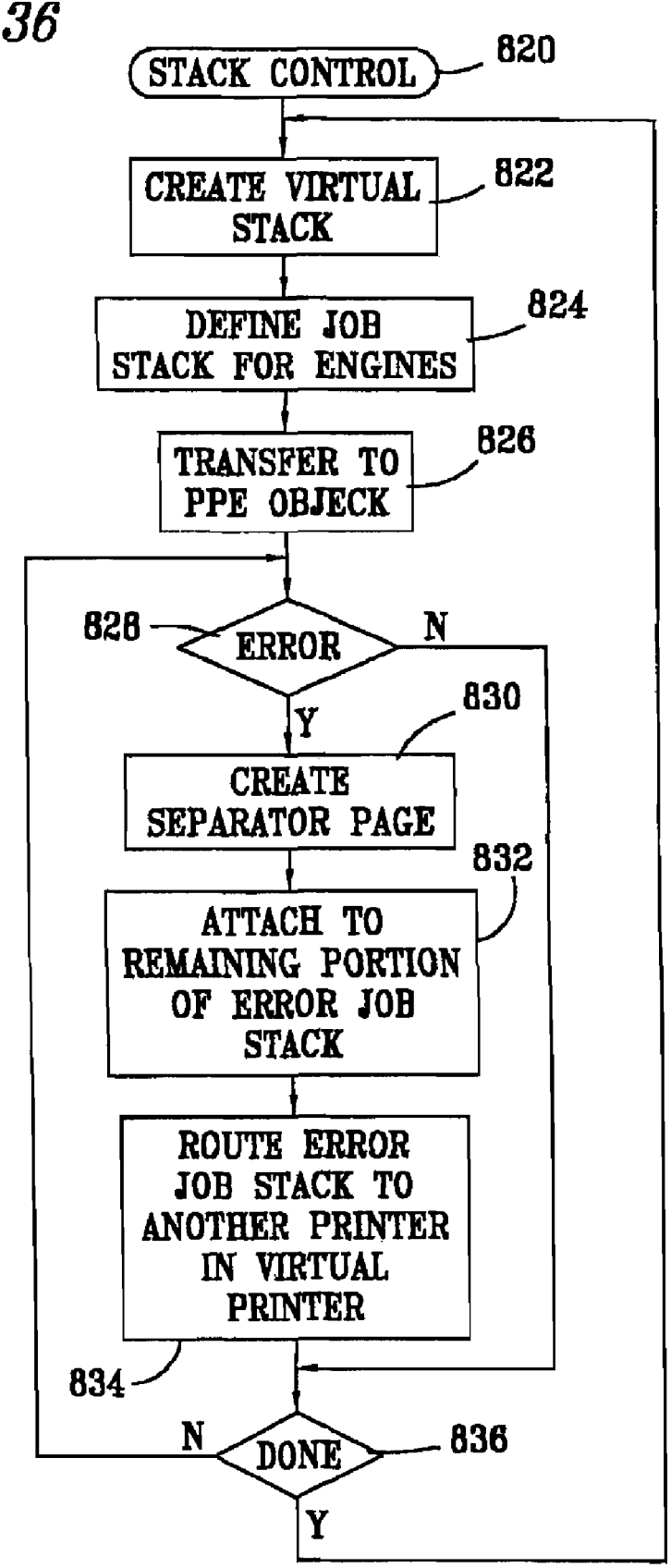
FIG. 36 illustrates a flowchart for the stack control operation.

Referring now to FIG. 36, there is illustrated a flowchart depicting the stack control, which is initiated at a block 820 and then flows to a function block 822. The function block 822 creates the virtual stack and then the program flows to a function block 824 to define the job stack for each of the engines. This essentially defines the borders between engines. The program then flows to a function block 826 to transfer the job stacks to the PPE object and then the program flows to a decision block 828 to determine if an error has occurred. This error is an error that has been returned by the engine, which is handled by the PPE object and then is relayed to the job manager. If the error occurs, the program will flow along a "Y" path to a function block 830 to create a separator page and then to a function block 832 to attach the separator page to the remaining portion of the error job stack, the error job stack being that portion left over after the generation of the error, including the page that did not get printed, if this is the case.

The program will then flow to a function block 834, move the error job stack to another printer in the virtual printer set, such that the print operation can be completed. The program will then flow to a decision block 836 to determine if the print operation is done. The decision block 828, when an error has been determined not to have occurred, will also flow to the input of decision block 836. If the job is not done, the program will flow along an "N" path back to the input of the error decision block 828 which will continue until all pages are printed. At this time, the program will flow from decision block 836 back to the input of function block 822.

It can be seen that this system automatically determines errors and, upon determination of an error, can automatically change the configuration of the system, such that a given job stack can be routed to a different printer. It is only necessary to create some type of separator page to indicate to an operator that an error has occurred and how the job is to be assembled.

Figure 37:
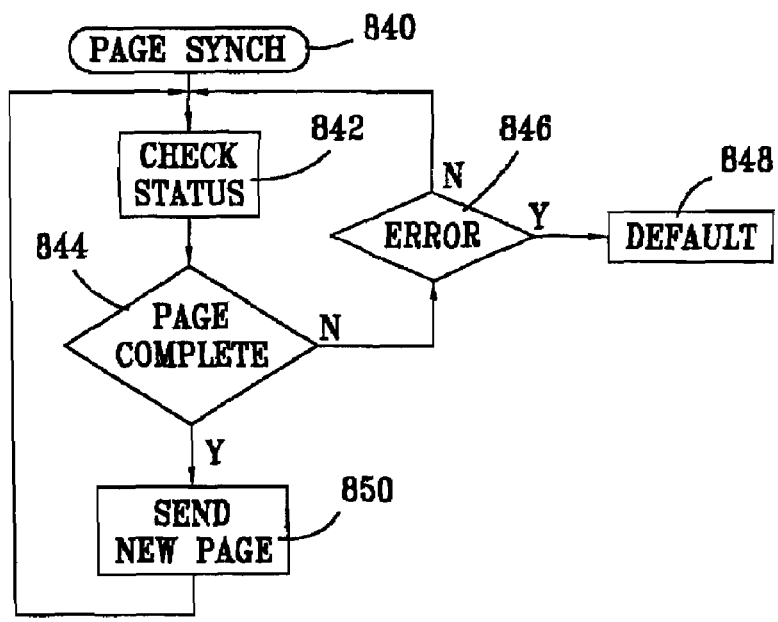
FIGS. 37 and 38 illustrate flowcharts for the page synchronization operation.

Referring now to FIG. 37, there is illustrated a flowchart depicting a page synchronization operation. Page synchronization is an operation whereby planes of color for each page are evaluated as to their completeness. When a complete plane has been printed, the next plane can be printed. If, for some reason, a given plane is not completely printed, it is possible that the system will go out of synchronization, such that the data for the next plane will be disposed behind that plane and will be sent to the FIFO in the print adapter. Therefore, it is necessary to know that all planes are being printed in a given print job, due to the speed of printing. Otherwise, a very large job could be destroyed.

The page synchronization operation of FIG. 37 is initiated at function block 840 and then proceeds to a function block 842 to check the status signal received from the print adapter. The program then flows to a decision block 844 to determine if the page transmitted is complete. If not, the program will flow to a decision block 846 to determine if an error signal has been received, indicating that a problem has occurred and the page was not completely printed upon the generation of an EOP (End Of Plane) signal. If the EOP signal has not been received and an error signal has not been received, the program will flow to the input of function block 842 to again check the status. This will continue until an error is determined, at which time the program will flow from decision block 846 to a default block 848 and, when the page is complete with no error, the program will flow to a function block 850 to send a new page for processing.

Figure 38:
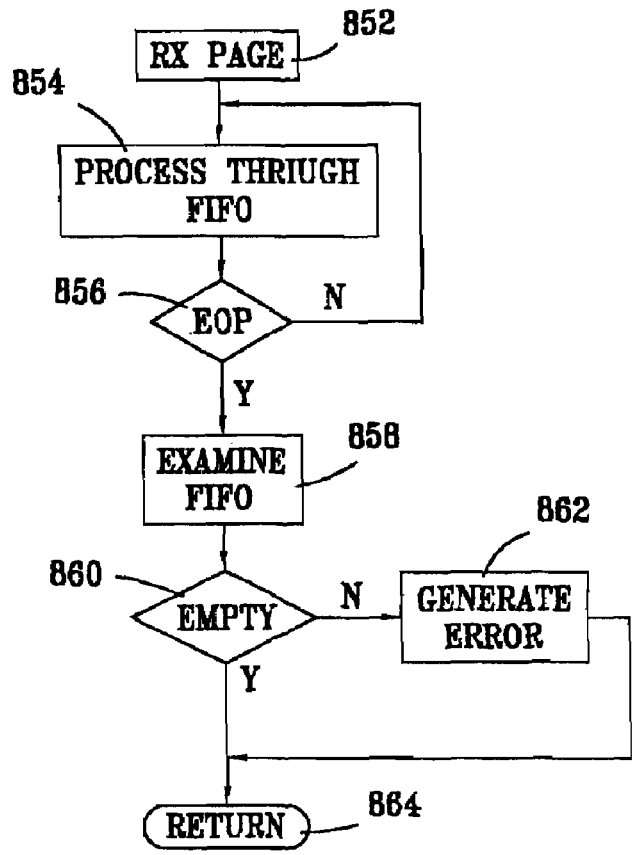

Referring now to FIG. 38, there is illustrated a flowchart for the operation in the print adapter. The print adapter is initiated at function block 852 to receive the page and then flows to a function block 854 to process this rasterized data through the FIFO. The program then flows to a decision block 856 to determine if an EOP signal has been generated. If not, the program will continue back to the input of function block 854. When the EOP signal has been generated, the program will flow along a "Y" path to a function block 858 to examine the contents of the FIFO. If the page has been completely printed, the FIFO 858 would be empty. This will be determined by decision block 860. If not empty, the program will flow to a function block 862 to generate an error signal and, if so, the program will flow to a return block 864 and transfer EOP signal out with no error.

Figure 39:
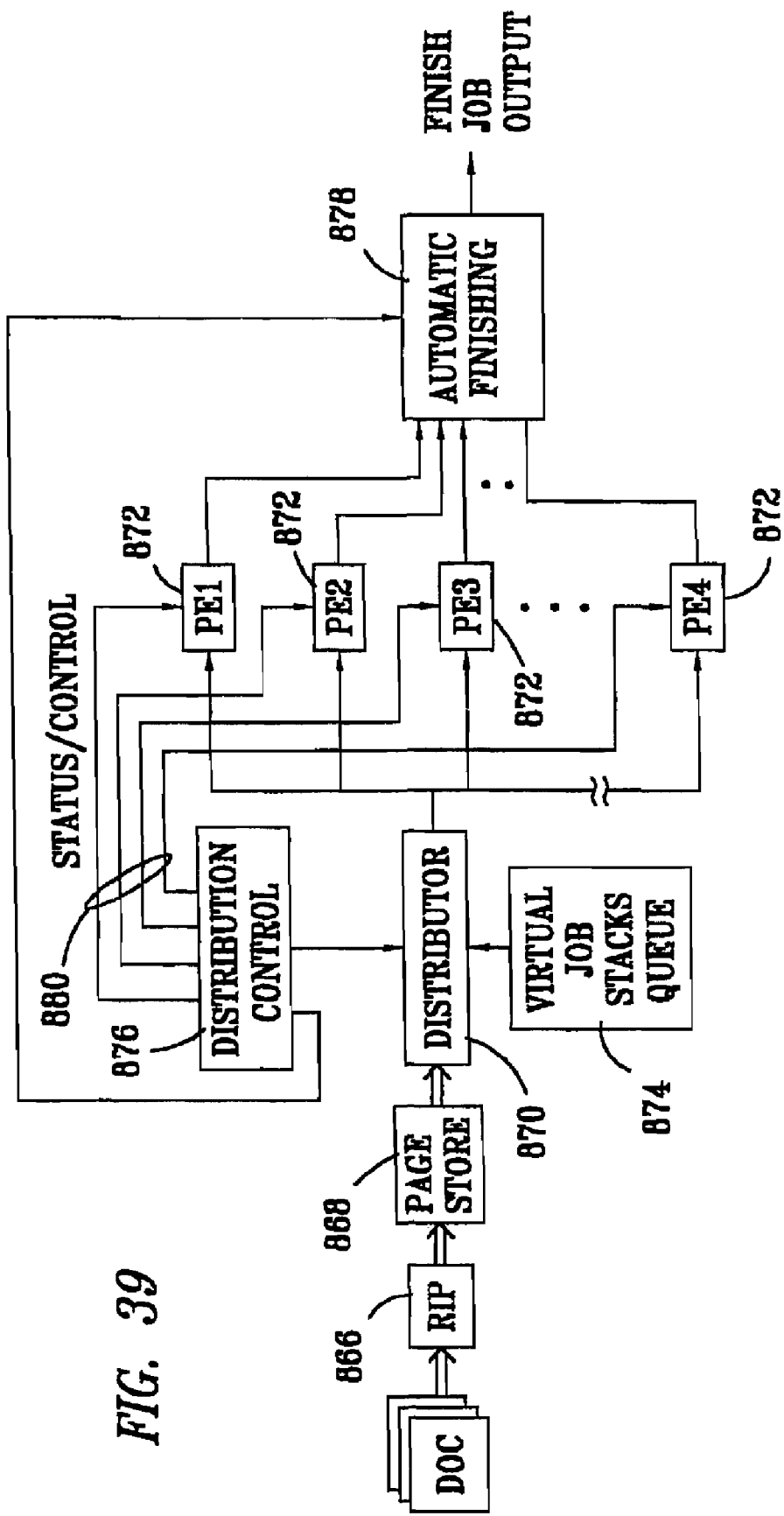
FIG. 39 illustrates a block diagram of an embodiment of the present invention utilizing an automatic finishing step.

Referring now to FIG. 39, there is illustrated a block diagram of an alternate embodiment of the present invention. Documents are initially input to the software RIP as described above, represented by a block 866. The program then flows to a page store operation 868, which is operable to store the rasterized pages, which are then distributed by distributor 870, this being the operation described above with respect to the Print Station Manager and the job manager, in addition to the PPE objects. The distributor 870 is basically operable to develop the virtual stacks and the job stacks and configure them for routing to a multiplicity of print engines 872. The engines 872 are as described above and can be any type of engines, i.e., color, black-and-white, etc.

The distributor is controlled by the distributor control 876, which is operable to determine how the virtual stacks set in the virtual stack queue 874 are divided up into job stacks and routed to the various print engines 872. This is normally done as described above. The output of the print engines 872 are input to an automatic finishing device 878. The automatic finishing device 878 is a device that will automatically retrieve the contents of the print engines 872 and buffer them in a manner that they will automatically determine how the contents of the engines 872 are to be collated into the finished job output. Each of the print engines 872 also provides status/control information on lines 880, which status/control information can return error information back to the distributor control 876. The distributor control 876 is operable to configure the automatic finishing device 878 and also reconfigure the automatic finishing device 878.

For example, if the distributor control 876 had determined a particular routing configuration for the job stacks and one of the print engines 872 failed, the distribution control could redefine the job stacks and reconfigure the automatic finishing device 878. This, therefore, allows the system to run multiple jobs through by dividing them into job stacks and then treating each of the job stacks as individual entities and queuing them up and processing them independent of how fast another job stack in a given job is processed through an adjacent print engine. The automatic finishing device 878 will retrieve the output and place it in the proper order.

Figure 40:
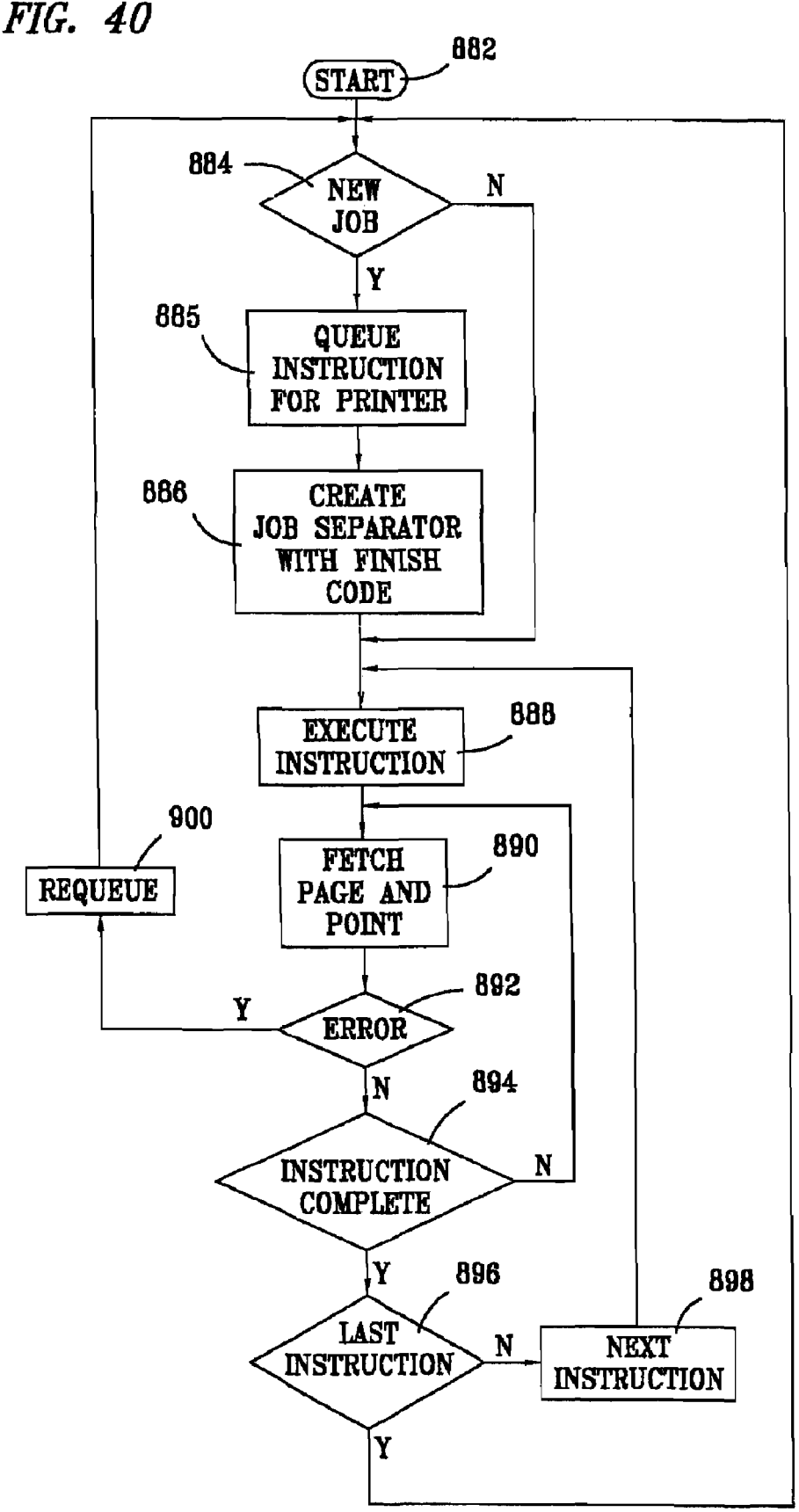
FIG. 40 illustrates a flowchart for the embodiment of FIG. 39.

Referring now to FIG. 40, there is illustrated a flowchart depicting the operation of the device of FIG. 39. The program is initiated at a block 882 and then proceeds to a decision block 884. The decision block 884 determines if a new job is printed. If so, the program flows to a function block 884 to queue the instructions for the printer and then to a function block 886 to create a job separator with a finish code, this separator providing a code that can be read by the automatic finishing device 878. This could be as simple as a bar code. The program then flows to a function block 888 to execute the instructions in the job stack for a given printer and then to a function block 890 to fetch a given page and print it in accordance with the PPE object.

The program then flows to a decision block 892 to determine if an error has occurred. If not, the program flows to a decision block 894 to determine if the instruction execution has been completed. If not, the program will flow back to the input of function block 890. If so, the program will flow to a decision block 896 to determine if the last instruction has been received. If not, the program flows to decision block 898 to fetch the next instruction and then back to the input of function block 888. When the last instruction has been received, the program flows along the "Y" path back to the input of decision block 884.

If a new job has not been received, the program will flow along a "node" path from decision block 884 around function blocks 885 and 886. Additionally, when an error has been defined, the program will flow from decision block 892 to a function block 900 to re-queue the operation, i.e., send it to a different print engine 872.

The automatic finishing machine 878 can be reconfigured by the distribution control 876 or, it can merely act in response to separator pages that are provided for each job stack. This will then merely require an individual manually moving the stacks from the print engine output bin to the automatic finishing device 878. Alternatively, the automatic finishing machine 878 could automatically extract the output from each of the print engines 872 and assemble it in accordance with the information received from the distribution control 876.

Although the preferred embodiment has been described in detail, it should be understood that various changes, substitutions and alterations can be made therein without departing from the spirit and scope of the invention as defined by the appended claims.

The invention claimed is:

1. A method for printing a print job on a printer having a toner cartridge having an initial amount of toner, the print job comprising a predetermined number of image pixels, each image pixel comprising a value between completely OFF to completely ON, the method comprising:
   determining a maximum amount of toner required to print the print job on the printer;
   summing the pixel values to generate an accumulated pixel value;
   dividing the accumulated pixel value by the predetermined number of image pixels to generate an average pixel value;
   calculating an amount of toner required to print the print job by multiplying the average pixel value by the determined maximum toner amount; and
   printing the print job only if a difference between the calculated toner amount and the initial toner amount exceeds a minimum toner level.

2. The method of claim 1, further comprising communicating a toner low command if the difference is less than the minimum toner level.

3. The method of claim 1, further comprising sending the print job to an alternative printer if the difference is less than the minimum toner level.

4. The method of claim 1, wherein:
   the image pixel values range from a minimum value to a maximum value; and
   calculating comprises summing the image pixel values of all image pixels having values greater than the minimum value.

5. The method of claim 4, wherein the minimum value is zero.

6. The method of claim 4, wherein the maximum value is 255.

7. The method of claim 1, wherein calculating further comprises determining an average of substantially all pixel values of the rasterized print job.

8. The method of claim 7, further comprising calculating the average as a percentage of a black page.

9. The method of claim 8, further comprising multiplying the percentage by a maximum amount of toner required to print a black page.

10. Apparatus for printing a print job on a printer having a toner cartridge having an initial amount of toner, the print job comprising a predetermined number of image pixels, each image pixel comprising a value between completely OFF to completely ON, the apparatus comprising:
    means for determining a maximum amount of toner required to print the print job on the printer;
    means for summing the pixel values to generate an accumulated pixel value;
    means for dividing the accumulated pixel value by the predetermined number of image pixels to generate an average pixel value;
    means for calculating an amount of toner required to print the print job by multiplying the average pixel value by the determined maximum toner amount; and
    means for printing the print job only if a difference between the calculated toner amount and the initial toner amount exceeds a minimum toner level.

11. The apparatus of claim 10, further comprising means for communicating a toner low command if the difference is less than the minimum toner level.

12. The apparatus of claim 10, further comprising means for sending the print job to an alternative printer if the difference is less than the minimum toner level.

13. The apparatus of claim 10, wherein:
    the image pixel values range from a minimum value to a maximum value; and
    the means for calculating comprises means for summing the image pixel values of all image pixels having values greater than the minimum value.

14. The apparatus of claim 13, wherein the minimum value is zero.

15. The apparatus of claim 13, wherein the maximum value is 255.

16. The apparatus of claim 10, wherein the means for calculating further comprises means for determining an average of substantially all pixel values of the rasterized print job.

17. The apparatus of claim 16, further comprising means for calculating the average as a percentage of a black page.

18. The apparatus of claim 17, further comprising means for multiplying the percentage by a maximum amount of toner required to print a black page.

* * * * *